US011138680B1

(12) United States Patent
Matoba

(10) Patent No.: US 11,138,680 B1
(45) Date of Patent: Oct. 5, 2021

(54) UPDATING MENUS BASED ON PREDICTED EFFICIENCIES

(71) Applicant: Square, Inc., San Francisco, CA (US)

(72) Inventor: Marc Matoba, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/198,336

(22) Filed: Nov. 21, 2018

(51) Int. Cl.
 *G06Q 50/12* (2012.01)
 *G06Q 20/12* (2012.01)
 *G06Q 30/06* (2012.01)
 *G06Q 20/22* (2012.01)
 *G06F 3/0482* (2013.01)

(52) U.S. Cl.
 CPC ........... *G06Q 50/12* (2013.01); *G06F 3/0482* (2013.01); *G06Q 20/12* (2013.01); *G06Q 20/29* (2013.01); *G06Q 30/0641* (2013.01)

(58) Field of Classification Search
 CPC .... G06Q 50/01; G06Q 50/12; G06Q 30/0641; G06Q 20/102; G06Q 20/12; G06Q 20/20
 See application file for complete search history.

(56) References Cited

U.S. PATENT DOCUMENTS

| | | |
|---|---|---|
| 4,485,300 A | 11/1984 | Peirce |
| 6,088,681 A | 7/2000 | Coleman et al. |
| 6,208,976 B1 | 3/2001 | Kinebuchi et al. |
| 6,373,950 B1 | 4/2002 | Rowney |
| 6,473,740 B2 | 10/2002 | Cockrill et al. |
| 6,727,925 B1 | 4/2004 | Bourdelais |
| 6,732,934 B2 | 5/2004 | Hamilton et al. |
| 6,920,431 B2 | 7/2005 | Showghi et al. |
| 7,071,842 B1 | 7/2006 | Brady, Jr. |
| 7,293,254 B2 | 11/2007 | Bloesch et al. |

(Continued)

FOREIGN PATENT DOCUMENTS

| | | |
|---|---|---|
| TW | 201604822 A | 2/2016 |
| WO | 2008/087003 A1 | 7/2008 |
| WO | 2018/063474 A1 | 4/2018 |

OTHER PUBLICATIONS

Examination Report No. 1 for Australian Patent Application No. 2015264085, dated Jan. 16, 2020, 4 pages.

(Continued)

*Primary Examiner* — Peter Ludwig
(74) *Attorney, Agent, or Firm* — Lee & Hayes, P.C.

(57) ABSTRACT

Notifying customers of available efficiencies via updates to electronic menus, personal notifications, etc. is described herein. As an example, a computing system can receive a first request indicating that an item that is offered for sale by a merchant that has been requested by a customer and can determine an efficiency associated with combining the first request with a second request from another customer. Such an efficiency, for example, can comprise sharing an item on a menu or preparing multiple items together instead of individually. The computing system can notify, in near real-time and based at least partly on determining the efficiency associated with combining the first request and the second request, at least the other customer about the efficiency. In some examples, the other customer can be notified via an update to the electronic menu, a personal notification to a user computing device, etc.

20 Claims, 12 Drawing Sheets

(56) References Cited

U.S. PATENT DOCUMENTS

| | | | |
|---|---|---|---|
| 7,370,794 B2 * | 5/2008 | Trane | G06Q 20/206 235/380 |
| 7,536,307 B2 | 5/2009 | Barnes et al. | |
| 7,571,468 B1 | 8/2009 | Williams | |
| 7,606,734 B2 | 10/2009 | Baig et al. | |
| 7,680,690 B1 | 3/2010 | Catalano | |
| 7,685,052 B2 | 3/2010 | Waelbroeck et al. | |
| 7,748,621 B2 | 7/2010 | Gusler et al. | |
| 7,756,745 B2 | 7/2010 | Leet et al. | |
| 7,797,204 B2 | 9/2010 | Balent | |
| 7,805,382 B2 | 9/2010 | Rosen et al. | |
| 7,942,337 B2 | 5/2011 | Jain | |
| 7,958,029 B1 | 6/2011 | Bobich et al. | |
| 8,069,085 B2 | 11/2011 | Ahlers et al. | |
| 8,123,370 B2 | 2/2012 | Maekawa | |
| 8,190,483 B2 | 5/2012 | Woycik et al. | |
| 8,260,723 B2 | 9/2012 | Carroll | |
| 8,370,207 B2 | 2/2013 | Edwards | |
| 8,380,177 B2 | 2/2013 | Laracey | |
| 8,606,703 B1 | 12/2013 | Dorsey et al. | |
| 8,671,002 B2 | 3/2014 | Stefik et al. | |
| 8,676,708 B1 | 3/2014 | Honey | |
| 8,688,574 B2 | 4/2014 | Stringfellow et al. | |
| 8,694,456 B2 | 4/2014 | Grigg et al. | |
| 8,700,659 B2 | 4/2014 | Skeen et al. | |
| 8,732,193 B2 | 5/2014 | Skeen et al. | |
| 8,738,451 B2 | 5/2014 | Ahlers et al. | |
| 8,762,207 B2 | 6/2014 | Kobres | |
| 8,799,111 B2 | 8/2014 | Prellwitz et al. | |
| 8,831,677 B2 | 9/2014 | Villa-Real | |
| 8,856,170 B2 | 10/2014 | Skeen et al. | |
| 8,862,504 B2 | 10/2014 | Sobek | |
| 8,875,990 B2 | 11/2014 | Bishop et al. | |
| 8,885,894 B2 | 11/2014 | Rowen et al. | |
| 8,977,567 B2 | 3/2015 | Aabye et al. | |
| 9,002,584 B2 | 4/2015 | Van Wiemeersch et al. | |
| 9,037,491 B1 | 5/2015 | Lee | |
| 9,064,359 B2 | 6/2015 | Lert, Jr. et al. | |
| 9,165,298 B2 | 10/2015 | Hayhow | |
| 9,195,982 B2 | 11/2015 | Orr et al. | |
| 9,218,413 B2 | 12/2015 | Skeen et al. | |
| 9,230,292 B2 | 1/2016 | Amin et al. | |
| 9,269,103 B1 | 2/2016 | Kumar et al. | |
| 9,299,102 B1 | 3/2016 | Pike et al. | |
| 9,311,639 B2 | 4/2016 | Filler | |
| 9,342,823 B2 | 5/2016 | Casares et al. | |
| 9,349,108 B2 | 5/2016 | Skeen et al. | |
| 9,355,470 B2 | 5/2016 | Merrell et al. | |
| 9,390,424 B2 | 7/2016 | Hendrickson | |
| 9,409,978 B2 | 8/2016 | Doxsey et al. | |
| 9,426,183 B2 | 8/2016 | Shahidzadeh et al. | |
| 9,430,784 B1 | 8/2016 | Frederick et al. | |
| 9,444,932 B2 | 9/2016 | Ravenel et al. | |
| 9,477,995 B2 | 10/2016 | Nathanel et al. | |
| 9,515,999 B2 | 12/2016 | Ylonen | |
| 9,536,243 B2 | 1/2017 | Khan | |
| 9,563,890 B2 | 2/2017 | Zhou | |
| 9,569,757 B1 | 2/2017 | Wilson et al. | |
| 9,569,768 B2 | 2/2017 | Kean | |
| 9,576,285 B2 | 2/2017 | Zhou | |
| 9,576,289 B2 | 2/2017 | Henderson et al. | |
| 9,582,797 B1 | 2/2017 | Holmes et al. | |
| 9,633,344 B2 | 4/2017 | Nathanel et al. | |
| 9,666,023 B2 | 5/2017 | Irwin, Jr. | |
| 9,734,463 B2 | 8/2017 | Skeen et al. | |
| 9,785,930 B1 | 10/2017 | Terra et al. | |
| 9,799,028 B2 | 10/2017 | Dickelman | |
| 9,799,380 B2 | 10/2017 | Liabraaten | |
| 9,811,838 B1 | 11/2017 | Daire et al. | |
| 9,817,646 B1 | 11/2017 | Chen et al. | |
| 9,824,233 B2 | 11/2017 | Kaplan et al. | |
| 9,824,408 B2 | 11/2017 | Isaacson et al. | |
| 9,858,614 B2 | 1/2018 | Seaward et al. | |
| 9,875,469 B1 * | 1/2018 | Chin | G06Q 20/3276 |
| RE46,731 E | 2/2018 | Woycik et al. | |
| 9,922,324 B2 | 3/2018 | Wilson et al. | |
| 9,934,784 B2 | 4/2018 | May et al. | |
| 9,940,374 B2 | 4/2018 | Orumchian et al. | |
| 9,959,529 B1 | 5/2018 | Varma et al. | |
| 9,965,755 B2 | 5/2018 | Richelson et al. | |
| 9,972,003 B2 | 5/2018 | Mooring, II et al. | |
| 10,002,397 B2 | 6/2018 | Rose | |
| 10,007,953 B1 | 6/2018 | Nathoo et al. | |
| 10,019,011 B1 | 7/2018 | Green et al. | |
| 10,019,149 B2 | 7/2018 | Chirakan et al. | |
| 10,019,698 B1 | 7/2018 | Scott et al. | |
| 10,026,062 B1 | 7/2018 | Sasmaz et al. | |
| 10,031,420 B2 | 7/2018 | Ongayi et al. | |
| 10,032,171 B2 | 7/2018 | Yeager | |
| 10,043,149 B1 | 8/2018 | Iacono et al. | |
| 10,043,162 B1 | 8/2018 | Renke et al. | |
| 10,043,209 B2 | 8/2018 | Cooke et al. | |
| 10,055,722 B1 | 8/2018 | Chen et al. | |
| 10,068,225 B2 | 9/2018 | Barrett | |
| 10,068,272 B1 | 9/2018 | Varma et al. | |
| 10,074,148 B2 | 9/2018 | Cashman et al. | |
| 10,078,820 B2 * | 9/2018 | Renke | G06Q 20/322 |
| 10,089,701 B2 | 10/2018 | Harman | |
| 10,091,617 B2 | 10/2018 | Chicoine et al. | |
| 10,108,951 B2 * | 10/2018 | Argue | G06Q 20/102 |
| 10,147,130 B2 | 12/2018 | Scholl et al. | |
| 10,168,860 B1 | 1/2019 | Bell et al. | |
| 10,210,569 B1 | 2/2019 | Kim et al. | |
| 10,255,645 B1 * | 4/2019 | Christensen | G06Q 20/322 |
| 10,275,752 B2 | 4/2019 | Wilson et al. | |
| 10,289,991 B1 | 5/2019 | Muller et al. | |
| 10,289,992 B1 | 5/2019 | Bell et al. | |
| 10,311,420 B1 | 6/2019 | Bell et al. | |
| 10,313,383 B2 | 6/2019 | Sommer | |
| 10,319,013 B2 | 6/2019 | Moring et al. | |
| 10,319,042 B2 | 6/2019 | Arvapally et al. | |
| 10,346,605 B2 | 7/2019 | Narasimhan | |
| 10,360,648 B1 | 7/2019 | Rocklin et al. | |
| 10,528,945 B1 | 1/2020 | Renke et al. | |
| 10,580,062 B1 | 3/2020 | Abrons et al. | |
| 10,607,435 B2 | 3/2020 | Lutnick et al. | |
| 10,628,815 B1 * | 4/2020 | Woo | G06Q 20/387 |
| 10,679,278 B2 | 6/2020 | Harman | |
| 10,740,715 B1 | 8/2020 | Kumar et al. | |
| 10,755,349 B1 | 8/2020 | Boates et al. | |
| 10,769,710 B2 * | 9/2020 | Yang | G06F 3/0482 |
| 10,915,905 B1 | 2/2021 | Callender | |
| 2002/0174014 A1 | 11/2002 | Wittrup | |
| 2002/0188492 A1 | 12/2002 | Borton | |
| 2002/0188495 A1 | 12/2002 | Banerjee et al. | |
| 2004/0158494 A1 | 8/2004 | Suthar | |
| 2004/0210621 A1 | 10/2004 | Antonellis | |
| 2004/0243468 A1 | 12/2004 | Cohagan et al. | |
| 2005/0030162 A1 | 2/2005 | Stambaugh | |
| 2006/0143087 A1 | 6/2006 | Tripp et al. | |
| 2006/0178986 A1 | 8/2006 | Giordano et al. | |
| 2006/0235755 A1 | 10/2006 | Mueller et al. | |
| 2006/0241966 A1 | 10/2006 | Walker et al. | |
| 2007/0060358 A1 | 3/2007 | Amaitis et al. | |
| 2007/0106411 A1 | 5/2007 | Huber-Buschbeck et al. | |
| 2007/0235533 A1 | 10/2007 | Giordano | |
| 2008/0015987 A1 | 1/2008 | Ramavarjula et al. | |
| 2008/0243828 A1 | 10/2008 | Reztlaff | |
| 2008/0312987 A1 | 12/2008 | Damodaran et al. | |
| 2008/0319864 A1 | 12/2008 | Leet | |
| 2009/0048890 A1 | 2/2009 | Burgh | |
| 2009/0063312 A1 | 3/2009 | Hurst | |
| 2009/0083069 A1 | 3/2009 | Tierney et al. | |
| 2009/0090783 A1 | 4/2009 | Killian et al. | |
| 2009/0192913 A1 | 7/2009 | Saito et al. | |
| 2009/0228336 A1 | 9/2009 | Giordano et al. | |
| 2010/0010906 A1 | 1/2010 | Grecia | |
| 2010/0088207 A1 | 4/2010 | McLaughlin et al. | |
| 2010/0120538 A1 | 5/2010 | DeWitt | |
| 2010/0125886 A1 | 5/2010 | Qian et al. | |
| 2011/0022472 A1 | 1/2011 | Zon | |
| 2011/0029359 A1 | 2/2011 | Roeding et al. | |
| 2011/0087592 A1 | 4/2011 | van der Veen et al. | |
| 2011/0125689 A1 | 5/2011 | Bernard et al. | |

(56) References Cited

U.S. PATENT DOCUMENTS

| | | |
|---|---|---|
| 2011/0215159 A1 | 9/2011 | Jain |
| 2011/0251909 A1 | 10/2011 | Clark |
| 2011/0288967 A1 | 11/2011 | Selfridge |
| 2011/0320345 A1 | 12/2011 | Taveau et al. |
| 2012/0130787 A1 | 5/2012 | Stouffer et al. |
| 2012/0130899 A1 | 5/2012 | McMonagle et al. |
| 2012/0136754 A1 | 5/2012 | Underwood |
| 2012/0173350 A1* | 7/2012 | Robson .............. G06Q 30/0643 705/16 |
| 2012/0191551 A1 | 7/2012 | Lutnick et al. |
| 2012/0209749 A1 | 8/2012 | Hammad et al. |
| 2012/0330837 A1 | 12/2012 | Persaud et al. |
| 2013/0042296 A1 | 2/2013 | Hastings et al. |
| 2013/0054863 A1 | 2/2013 | Imes et al. |
| 2013/0132274 A1 | 5/2013 | Henderson et al. |
| 2013/0226805 A1 | 8/2013 | Griffin et al. |
| 2013/0238455 A1 | 9/2013 | Laracey |
| 2013/0278631 A1 | 10/2013 | Border et al. |
| 2013/0290172 A1 | 10/2013 | Mashinsky |
| 2013/0317921 A1 | 11/2013 | Havas |
| 2014/0025524 A1 | 1/2014 | Sims et al. |
| 2014/0052586 A1 | 2/2014 | Weber |
| 2014/0058902 A1 | 2/2014 | Taylor et al. |
| 2014/0074580 A1 | 3/2014 | Khuchua-Edelman et al. |
| 2014/0097241 A1 | 4/2014 | Tovar et al. |
| 2014/0100971 A1 | 4/2014 | Klearman |
| 2014/0108237 A1 | 4/2014 | Carretta et al. |
| 2014/0136348 A1 | 5/2014 | Carroll et al. |
| 2014/0156431 A1 | 6/2014 | Morgan et al. |
| 2014/0171039 A1 | 6/2014 | Bjontegard |
| 2014/0188637 A1 | 7/2014 | Balasubramaniam et al. |
| 2014/0214465 A1 | 7/2014 | LHeureux et al. |
| 2014/0214534 A1 | 7/2014 | L'Heureux et al. |
| 2014/0236699 A1 | 8/2014 | Gupta et al. |
| 2014/0257926 A1 | 9/2014 | Rasband |
| 2014/0258011 A1 | 9/2014 | Shore |
| 2014/0263622 A1 | 9/2014 | Babatz et al. |
| 2014/0279276 A1 | 9/2014 | Tolcher |
| 2014/0279534 A1 | 9/2014 | Miles |
| 2014/0297470 A1 | 10/2014 | Ramadge et al. |
| 2014/0324607 A1 | 10/2014 | Frehn et al. |
| 2014/0330654 A1* | 11/2014 | Turney .............. G06Q 20/102 705/15 |
| 2014/0351068 A1 | 11/2014 | Renfroe |
| 2014/0351130 A1 | 11/2014 | Cheek et al. |
| 2015/0025983 A1 | 1/2015 | Cicerchi |
| 2015/0046297 A1 | 2/2015 | Bahrami et al. |
| 2015/0072663 A1 | 3/2015 | Chande et al. |
| 2015/0073925 A1 | 3/2015 | Renfroe |
| 2015/0081478 A1 | 3/2015 | Bahrami et al. |
| 2015/0095225 A1 | 4/2015 | Appana et al. |
| 2015/0100152 A1 | 4/2015 | Barragan Trevino et al. |
| 2015/0127496 A1 | 5/2015 | Marathe et al. |
| 2015/0142547 A1 | 5/2015 | Sewell et al. |
| 2015/0142594 A1 | 5/2015 | Lutnick et al. |
| 2015/0169034 A1 | 6/2015 | Huang et al. |
| 2015/0178712 A1 | 6/2015 | Angrish et al. |
| 2015/0186869 A1 | 7/2015 | Winters et al. |
| 2015/0187027 A1 | 7/2015 | Lowe |
| 2015/0213565 A1 | 7/2015 | Garrett et al. |
| 2015/0262121 A1 | 9/2015 | Riel-Dalpe et al. |
| 2015/0262208 A1 | 9/2015 | Bjontegard |
| 2015/0278789 A1 | 10/2015 | Richelson et al. |
| 2015/0287006 A1 | 10/2015 | Hunter et al. |
| 2015/0310408 A1* | 10/2015 | Anderson .............. G06Q 20/32 705/39 |
| 2016/0012465 A1 | 1/2016 | Sharp |
| 2016/0026958 A1 | 1/2016 | Lee |
| 2016/0029160 A1 | 1/2016 | Theurer et al. |
| 2016/0078264 A1 | 3/2016 | Armstrong et al. |
| 2016/0087854 A1 | 3/2016 | Jayanti Venkata et al. |
| 2016/0171584 A1 | 6/2016 | Cao |
| 2016/0180033 A1 | 6/2016 | Rosenberg |
| 2016/0267448 A1* | 9/2016 | James .............. G06Q 20/102 |
| 2016/0307151 A1 | 10/2016 | Grabovski et al. |
| 2016/0307176 A1 | 10/2016 | Renke et al. |
| 2016/0308798 A1 | 10/2016 | Magistrado et al. |
| 2016/0335613 A1 | 11/2016 | Laracey |
| 2016/0342972 A1 | 11/2016 | Berlin |
| 2016/0345176 A1 | 11/2016 | DeWitt et al. |
| 2017/0004475 A1 | 1/2017 | White et al. |
| 2017/0006429 A1 | 1/2017 | Douglas et al. |
| 2017/0055752 A1 | 3/2017 | Mueller et al. |
| 2017/0083901 A1 | 3/2017 | Spencer, II |
| 2017/0109843 A1 | 4/2017 | Berg et al. |
| 2017/0124670 A1 | 5/2017 | Becker et al. |
| 2017/0124671 A1 | 5/2017 | Tam et al. |
| 2017/0193470 A1* | 7/2017 | Renke .............. G06Q 20/102 |
| 2017/0243195 A1 | 8/2017 | Xing |
| 2017/0255898 A1 | 9/2017 | Thomas |
| 2017/0278202 A1 | 9/2017 | Mimassi |
| 2017/0278204 A1 | 9/2017 | Mimassi |
| 2017/0287086 A1 | 10/2017 | Lopez et al. |
| 2017/0293950 A1 | 10/2017 | Rathod |
| 2017/0314981 A1 | 11/2017 | Flockenhaus et al. |
| 2018/0025318 A1 | 1/2018 | Baggot et al. |
| 2018/0039965 A1 | 2/2018 | Han et al. |
| 2018/0089658 A1 | 3/2018 | Bell et al. |
| 2018/0122022 A1 | 5/2018 | Kelly et al. |
| 2018/0123804 A1 | 5/2018 | Smith et al. |
| 2018/0150868 A1 | 5/2018 | Stone et al. |
| 2018/0261223 A1 | 9/2018 | Jain et al. |
| 2018/0268328 A1 | 9/2018 | Baggott et al. |
| 2018/0341933 A1 | 11/2018 | Renke et al. |
| 2018/0364887 A1 | 12/2018 | Bell et al. |
| 2018/0365663 A1 | 12/2018 | Bell et al. |
| 2019/0205834 A1 | 7/2019 | Bell et al. |
| 2019/0205856 A1 | 7/2019 | Bell et al. |
| 2019/0205857 A1 | 7/2019 | Bell et al. |
| 2020/0273086 A1 | 8/2020 | Abrons et al. |
| 2020/0356967 A1 | 11/2020 | Bell et al. |
| 2020/0364710 A1 | 11/2020 | Varma et al. |

OTHER PUBLICATIONS

Non-Final Office Action dated Jul. 31, 2020, for U.S. Appl. No. 15/858,100, of Bell, B., et al., filed Dec. 29, 2017.

Advisory Action dated Aug. 5, 2019, for U.S. Appl. No. 15/279,705, of Bell, B., et al., filed Sep. 29, 2016.

Advisory Action dated Aug. 14, 2019, for U.S. Appl. No. 15/279,782, of Bell, B., et al., filed Sep. 29, 2016.

Notice of Allowance dated Sep. 10, 2019, for U.S. Appl. No. 15/279,705, of Bell, B., et al., filed Sep. 29, 2016.

Non-Final Office Action dated May 20, 2020 for U.S. Appl. No. 15/858,164, of Bell, B., et al., filed Dec. 29, 2017.

Examiner Requisition for Canadian Patent Application No. 3038958, dated Apr. 24, 2020, 6 pages.

McCormack, et. al., "2D LIDAR as a Distributed Interaction Tool for Virtual and Augmented Reality Video Games," IEEE Games Entertainment Media Conference, pp. 1-5 (Oct. 2015).

Statler, S., "Our digital and physical worlds collide—beacons," Air Transport IT Review, Sita, pp. 1-6 (Year: 2016).

Woyke, E., "Flow Stores Will Use Augmented Reality to Make You Buy More Stuff," MIT Technology Review, pp. 1-4 (Jun. 17, 2016).

Final Office Action dated May 2, 2019, for U.S. Appl. No. 15/279,705, of Bell, B., et al., filed Sep. 29, 2016.

Notice of Allowance dated May 8, 2019, for U.S. Appl. No. 15/279,854, of Bell, B., et al., filed Sep. 29, 2016.

Final Office Action dated Jun. 13, 2019, for U.S. Appl. No. 15/279,782, of Bell, B., et al., filed Sep. 29, 2016.

Agnes Kanyan et al., "Improving the Service Operations of Fast-food Restaurants," Procedia Social and Behavioral Sciences, www.sciencedirect.com 2015.

Notice of Allowance dated Apr. 10, 2020, for U.S. Appl. No. 15/279,782, of Bell, B., et al., filed Sep. 29, 2016.

Non-Final Office Action dated Dec. 19, 2016, for U.S. Appl. No. 15/279,650, of Bell, B., et al., filed Sep. 29, 2016.

Final Office Action dated Jun. 19, 2017, for U.S. Appl. No. 15/279,650, of Bell, B., et al., filed Sep. 29, 2016.

(56) References Cited

OTHER PUBLICATIONS

Advisory Action dated Sep. 11, 2017, for U.S. Appl. No. 15/279,650, of Bell, B., et al., filed Sep. 29, 2016.
Non-Final Office Action dated Apr. 9, 2018, for U.S. Appl. No. 15/279,650, of Bell, B., et al., filed. Sep. 29, 2016.
Non-Final Office Action dated Aug. 10, 2018, for U.S. Appl. No. 15/279,854, of Bell, B., et al., filed. Sep. 29, 2016.
Notice of Allowance dated Aug. 15, 2018, for U.S. Appl. No. 15/279,650, of Bell, B., et al., filed Sep. 29, 2016.
Non-Final Office Action dated Oct. 5, 2018, for U.S. Appl. No. 15/279,705, of Bell, B., et al., filed Sep. 29, 2016.
Non-Final Office Action dated Dec. 28, 2018, for U.S. Appl. No. 15/279,782, of Bell, B., et al., filed Sep. 29, 2016.
Final Office Action dated Feb. 8, 2019, for U.S. Appl. No. 15/279,854, of Bell, B., et al., filed. Sep. 29, 2016.
International Search Report and Written Opinion for International Application No. PCT/US2017/042537, dated Oct. 6, 2017.
Non-Final Office Action dated Dec. 4, 2020 for U.S. Appl. No. 16/940,291, of Bruce, B., filed Jul. 27, 2020.
Examination Report No. 2 for Australian Patent Application No. 2017337335, dated Aug. 31, 2020, 3 pages.
Examination Report No. 3 for Australian Patent Application No. 2017337335, dated Jan. 4, 2021, 4 pages.
Mercury, "Bar Tabs and Credit Cards: The Mixology for POS Developers," Credit Card Acceptance Procedures When Supporting Bar Tabs, pp. 1-9 (May 29, 2014).
Non-Final Office Action dated Jun. 25, 2015, for U.S. Appl. No. 14/675,555, of Renke, C.P., et al., filed Mar. 31, 2015.
Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 2, 2018, for U.S. Appl. No. 15/195,557, of Abrons, A., et al., filed Jun. 28, 2016.
Non Final Office Action dated Oct. 10, 2018, for U.S. Appl. No. 15/189,131, of Rocklin, W., et al., filed Jun. 22, 2016.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Final Office Action dated Mar. 28, 2019, for U.S. Appl. No. 15/195,557, of Abrons, A., et al., filed Jun. 28, 2016.
Advisory Action dated May 29, 2019, for U.S. Appl. No. 15/195,557, of Abrons, A., et al., filed Jun. 28, 2016.
Non Final Office Action dated Jun. 28, 2019, for U.S. Appl. No. 15/195,557, of Abrons, A., et al., filed Jun. 28, 2016.
Notice of Allowance dated Aug. 14, 2019, for U.S. Appl. No. 14/675,555, of Renke, C.P., et al., filed Mar. 31, 2015.
Notice of Allowance dated Oct. 23, 2019, for U.S. Appl. No. 15/195,557, of Abrons, A., et al., filed Jun. 28, 2016.
Non Final Office Action dated Apr. 23, 2020, for U.S. Appl. No. 16/219,060, of Kyle, C., filed Dec. 13, 2018.
Non-Final Office Action dated Jun. 15, 2020, for U.S. Appl. No. 16/053,576, of Renke, C.P., et al., filed Aug. 2, 2018.
Notice of Allowance dated Oct. 5, 2020, for U.S. Appl. No. 16/219,060, of Kyle, C., filed Dec. 13, 2018.
Final Office Action dated Dec. 15, 2020, for U.S. Appl. No. 16/053,576, of Renke, C.P., et al., filed Aug. 2, 2018.
Non-Final Office Action dated Dec. 15, 2020, for U.S. Appl. No. 16/383,375, of Bruce, B, et al., filed Apr. 12, 2019.
Final Office Action dated Mar. 22, 2021, for U.S. Appl. No. 16/383,375, of Bruce, B, et al., filed Apr. 12, 2019.
Notice of Allowance dated Mar. 31, 2021, for U.S. Appl. No. 16/053,576, of Renke, C.P., et al., filed Aug. 2, 2018.

* cited by examiner

UPDATING MENUS BASED ON PREDICTED EFFICIENCIES

BACKGROUND

Each year, over 11 million tons of food are wasted by restaurants in the United States. Such food waste amounts to over $25 billion per year. Conventional techniques for tracking food usage and/or waste often require manual data entry and observation (e.g., observing, weighing, and recording waste). While such techniques are helpful for reducing waste, such techniques are error-laden and inefficient. Furthermore, due to technological limitations, conventional techniques miss opportunities for further reducing waste and/or improving customer satisfaction.

BRIEF DESCRIPTION OF THE DRAWINGS

The above and other features of the present disclosure, its nature and various advantages, will be more apparent upon consideration of the following detailed description, taken in conjunction with the accompanying drawings, which are briefly described below.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
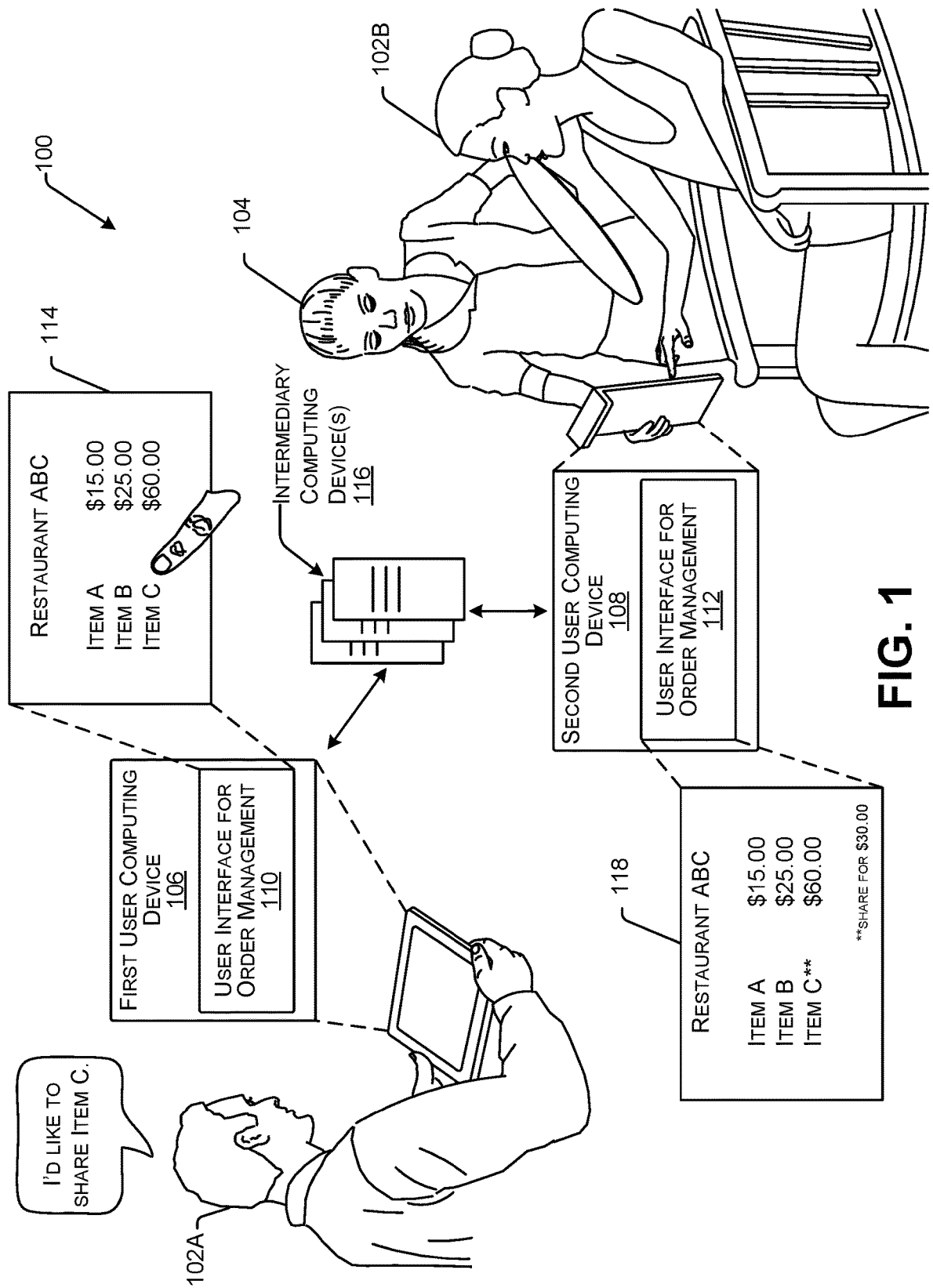
FIG. 1 illustrates an example environment for updating menus based on predicted efficiencies as described herein.

Techniques described herein are directed to managing menus, or otherwise providing notifications to customers, based on predicted efficiencies. A menu of offerings (e.g., items for sale) can be created or updated in near real-time based on interactions between a customer, other customers, and a merchant. In an example, a customer can indicate a desire to share an item with other, proximate customers of a merchant. In such an example, responsive to the customer providing an indication that the customer desires to share the item with other, proximate customers, the other, proximate customers can receive a notification that the item is available to be shared. For instance, the other, proximate customers can view an electronic menu that can be updated to indicate that the item is available for sharing, receive a notification that the item is available for sharing (e.g., via personal computing devices), etc. If another customer desires to share the item with the customer, the item can be split between a first ticket that is used to track interactions between the customer and the merchant and a second ticket that is used to track interactions between the other customer and the merchant. Both customers can otherwise interact with the merchant separately and a payment processing service can process payments for the first ticket and the second ticket. In at least one example, the customer can pay for a portion of a cost of the item (which can be based on a portion size) and the other customer can pay for a portion of the cost of the item (again, which can be based on a portion size). The payment processing service can deposit an amount of funds into an account of a merchant that is based on the cost of the item. That is, the customers can share the item and the merchant can receive the benefit of having sold an item that may not have otherwise been sold. Additionally, each of the customers can order a portion of the item instead of the entire item, thereby avoiding waste (e.g., if both customers ordered individual items without the intention to consume the entire items).

In at least one example, responsive to a customer requesting an item offered for sale by a merchant, a computing device can determine that the item is sharable. For the purpose of this discussion, an item can be "sharable" if an item can be divided (e.g., "portioned") into two or more portions (e.g., "sub-items") or the item can be combined to offer and/or prepare in a batch of multiple of the same item. In some examples, an item can be designated in an inventory of the merchant as being sharable. In additional or alternative examples, a customer can order a portion of an item, thereby indicating a desire to share the item. In some examples, the computing device can determine a cost associated with sharing the item (e.g., a cost that other customers that opt to share the item will be charged), which can be based on the portion size available for sharing. That is, the advertised cost of an item that is available for sharing can be based on the remaining portion size of the item. In at least one example, the advertised cost of the item that is available for sharing can decrease (e.g., to incentivize other customers to purchase the remaining portion) until a time period for sharing the item lapses.

Techniques described herein are directed to notifying customers that an item is available for sharing. In some examples, as described above, an electronic menu can be updated in near real-time to indicate that a portion of the item became available (e.g., after another customer ordered part of the item) or is otherwise available for sharing (and, in some examples, can indicate a reduced cost of the item). For the purpose of this discussion, "near real-time" can refer to a time that is substantially simultaneous with a current (e.g., real) time. That is, "near real-time" can refer to "real-time" or any time within a threshold period of time such that the time is substantially simultaneous with a current (e.g., real) time. In at least one example, an electronic menu can be presented via a computing device that is operable by a customer and/or an agent of a merchant (e.g., for instance at a table). In an additional or alternative example, an electronic menu can be presented via a computing device that displays that information to multiple customers at one time (e.g., a television, an electronic board, etc.). Further in at least one example, an electronic menu can be presented via an online platform, for instance, via a delivery service (e.g., GrubHub®, Caviar®, UberEats®, etc.), a pick-up service, etc. In some examples, techniques described herein can be directed to sending a notification to a personal device of a customer (e.g., a push notification, a text message, an email, etc.).

In at least one example, customer data associated with customers can be analyzed (e.g., using machine-trained models (e.g., supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc.) to identify target customers that are likely to be interested in sharing an item that another customer desires to share. That is, in some examples, a selected group of customers that are predicted to be interested in sharing an item can be targeted with a notification regarding a sharable item. And, in such examples, the update and/or notification can be triggered in a batch manner across devices associated with the selected group of customers. In some examples, an update and/or notification can be triggered in a batch manner across various devices without having first selecting a group of customers.

In some examples, an item can be associated with a condition after which the item is no longer sharable. In at least one example, the item can be made available for sharing for a time period and, after the time period lapses, the item may no longer be available for sharing. Or, the item can be portioned into a number of portion sizes and, after the number of portion sizes have been requested, the item may no longer be available for sharing. In such examples, customers can be notified that the item is no longer available to be shared. In at least one example, just prior to the time period elapsing, a last-chance offer can be surfaced to customers in an effort to encourage such customers to share the item. In some examples, an item can be ordered conditionally, based on other customer(s) agreeing to share the item. That is, if, after the lapse of the time period during which a request to share an item must be received, no other customer has agreed to share the item, the customer can determine not to order the item. Additional details associated with examples described above are described below.

As a non-limiting example, a customer can desire to drink a type of wine that is available by the bottle but is not available by the glass. The customer may not want the entire bottle and may be interested in sharing the item with another customer at the same restaurant. In such an example, the bottle of wine can be added to the customer's ticket and one or more other customers at the restaurant can be notified that the bottle is available for sharing. In some examples, an electronic menu can update, in near real-time, to reflect that the bottle of wine is available for sharing. For instance, the bottle of wine can be associated with an indication that it is sharable, a portion size and corresponding price can be presented, the wine can be added to the "by the glass" list, etc. In additional or alternative examples, a notification can be sent to one or more customers, for instance, via respective mobile devices of the one or more customers. In at least one example, customer data associated with customers can be analyzed (e.g., using machine-trained models, statistical models, etc.) to identify target customers that are likely to be interested in sharing the bottle of wine with the customer. If another customer indicates that he/she desires to share the bottle of wine with the customer, the customer's ticket can be updated to indicate a split-item and the other customer's ticket can be updated (or generated) to indicate a split-item. A cost of the bottle of wine can be allocated between the first customer and the second customer. In some examples, the allocation between the first customer and the second customer can be based on portion sizes (e.g., glasses) ordered by the first customer and the second customer. When the first customer and the second customer are ready to settle their transactions, a payment processing service can process payment for the customer's ticket and payment for the other customer's ticket (independently) and can deposit funds based on the cost of the item to an account of a merchant (maintained by the payment processing service). That is, the customers can share the bottle of wine and the merchant can receive the benefit of having sold the bottle of wine that may not have otherwise been sold. Additionally, each of the customers can order a portion of the bottle of wine instead of the entire bottle of wine, thereby avoiding waste (e.g., if both customers ordered individual items without the intention to consume the entire items).

While the examples described above are directed to an example where an item can be shared between two or more customers, in some examples, customers can be notified of opportunities to purchase an item (or take another action associated with an item) in an effort to achieve other efficiencies. As an example, it can be more efficient to make a batch of an item than to make the item individually. In such an example, to drive efficiency, proximate customer(s) can receive a notification that promotes the item, thereby incentivizing the customer(s) to order additional items, which can be made in a batch instead of individually. Or, in yet another example, an item can be nearing expiration (and thus spoliation), and thus proximate customer(s) can receive a notification that promotes the item. As a result, techniques described herein can be used to move items of inventory to avoid spoliation.

Furthermore, while the examples described above are described in the context of a restaurant, techniques described herein can be utilized in non-restaurant settings as well. For instance, a customer can be interested in sharing an item offered for sale from a retailer and, in such an example, other proximate customers can be notified of an opportunity to share the item with the customer. As a non-limiting example, a customer may want to share a bulk item of 12 paper towel rolls with another customer. In such an example, the customer can leverage techniques described herein to notify other customers that the bulk item of 12 paper towel rolls can be shared with another customer. Similarly, an online retailer can utilize techniques described herein to facilitate multiple customers sharing the purchase of an item or otherwise driving efficiencies. In yet an additional example, a mobile merchant can utilize techniques described herein to drive efficiency. For instance, based on determining a location of a customer of the mobile merchant, techniques described herein can be used to notify other proximately located customers to make the mobile merchant's visit to the customer more efficient (e.g., maximize profits, minimize commute between locations, etc.). As a non-limiting example, a merchant may be a fitness instructor (e.g., yoga teacher, personal trainer, etc.) that may be doing a house visit. Using techniques described herein, multiple customers can utilize techniques described herein to join a fitness session at the house to reduce the cost of the fitness session per customer and/or enable the merchant to serve multiple customers at the same time.

Techniques described herein are directed to unconventional, non-routine systems, methods, etc. that enable various efficiencies in merchant environments. That is, techniques described herein are directed to a network-based technical environment whereby network-connected devices including, but not limited to, merchant devices (configured as point-of-sale (POS) terminals), customer devices, and payment processing servers, exchange data to promote items for driving efficiencies such as reducing waste, streamlining preparation and production, and increasing customer satisfaction. As described above, customers can share items and merchants can receive the benefit of having sold items that may not have otherwise been sold. Additionally, customers can order portions of items instead of entire items, thereby avoiding waste (e.g., if both customers ordered individual items without the intention to consume the entire items). Furthermore, by combining orders, merchants can streamline preparation and production, thereby increasing efficiencies. In some examples, by promoting items to other customers, merchants can reduce waste by avoiding spoliation. That is, the unconventional, non-routine systems, methods, etc. described herein enable various efficiencies in merchant environments.

As described above, in at least one example, electronic menus can be dynamically updated in near real-time to alert customers that an item is available for sharing. That is, the network-based technical environment described above enables dynamic updates to electronic menus in near real-time and across various devices capable of displaying electronic menus so to enable instant access to information in a way that is not available via conventional techniques. For instance, conventional POS technologies are not configured to share information in a manner so to enable near real-time updates to electronic menus for enabling other customers to participate in orders, thereby promoting efficiencies. That is, the time window for receiving a request to share an item is short and thus promotion of sharable items must occur in near real-time to enable another customer to opt into sharing an item within the time window. The network-based technical environment described herein enables just that. Further, the menus are configured according to the device on which they are displayed. The electronic menus are also manipulated based on dynamic tracking, creation, and availability of sub-items (e.g., portions of items), which change based on whether an item is available or available for sharing. Specific rules can be created to apply such manipulations (e.g., the menu may not be manipulated if the sub-item should be highlighted for sharing at a later time). As such, techniques described herein are directed to systems, methods, etc. that are not well-understood, routine, and/or conventional in the field of POS technologies.

FIGS. 1-12 provide additional details associated with the techniques described above.

FIG. 1 illustrates an example environment 100 for updating menus based on predicted efficiencies as described herein. In an example, the environment can comprise at least two customers 102 (e.g., customer 102A and customer 102B) who are at a physical location of a merchant. A merchant, for the purpose of this discussion, can be any entity that offers items (e.g., goods, services, etc.) for acquisition (e.g., sale, lease, borrow, give away, etc.). A merchant can be an online merchant (thereby servicing customers via an online presence), a brick-and-mortar merchant (thereby servicing customers via physical locations), or a combination of both. In some examples, merchants can have one or more agents (e.g., employees, independent contractors, etc.) that work for, or on behalf of, the merchants. FIG. 1 includes an example of a waitress 104 working on behalf of the merchant. As described herein, actions attributed to a merchant can be performed by an agent of the merchant via a computing device.

A customer 102A, 102B, as described herein, can be any entity that interacts with a merchant and/or is capable of interacting with a merchant. In some examples, the first customer 102A and the second customer 102B can be sitting at a same table (or otherwise are associated with a same group) or different tables (or otherwise are associated with unrelated groups). In at least one example, the first customer 102A can interact with a first user computing device 106 and the second customer 102B can interact with a second user computing device 108. The first user computing device 106 and the second user computing device 108 can be merchant devices (e.g., owed by the merchant) or customer devices. Merchant devices can be computing devices that are owned by the merchant, but can be operated by customers, agents of the merchant, etc. Customer devices can be personal computing devices of the customers. Each user computing device 106, 108 can present a user interface (UI) to enable order management (e.g., UI for order management 110 and UI for order management 112, respectively). A UI for order management can be presented via a web browser, or the like, via a display of a user computing device. In at least one example, a UI for order management can be presented via an application, such as a mobile application or desktop application, which is provided by the payment processing service, or which can be an otherwise dedicated application.

In at least one example, the UI for order management 110 can present one or more items offered for sale by the merchant, for instance, via a menu 114. In some examples, the menu can be an electronic menu, which can be dynamically updated in near real-time, as described herein. In at least one example, the first customer 102A can interact with the UI for order management 110 to request an item (e.g., Item C). In at least one example, the first customer 102A can indicate that he would like to share the item with another customer. For instance, in an example, the first customer 102A can select a selectable control indicating that the first customer 102A desires to share the item. In additional or alternative examples, the first customer 102A can provide another input to indicate that he desires to share the item.

Responsive to receiving the input, the UI for order management 110 can add the item to a ticket associated with the first customer 102A. In some examples, a ticket can already exist, and, in such examples, the item can be added to the ticket. In other examples, the UI for order management 110 can generate a ticket for the first customer 102A. For the purpose of this discussion, a "ticket" is a data structure that can be used for tracking interactions between a customer and a merchant. In some examples, the ticket can be used to track interactions while the customer is at a physical location of a merchant. In additional or alternative examples, the ticket can track interactions prior to a customer's arrival at a physical location and/or after a customer's departure from the physical location. In some examples, a ticket can be used to track interactions between multiple customers and a merchant (e.g., customers sitting at a same table, etc.). In at least one example, a ticket can be stored on a user computing device 104A or at the intermediary computing device(s) 116. In some examples, a ticket can be stored on a user computing device 104A and a duplicate can be stored at the intermediary computing device(s) 116. In at least one example, the ticket can be used to track the addition of sharable and non-sharable items that a customer (or customers) orders from a merchant. Thus, in at least one example, the item (e.g., Item C) can be added to a ticket used for tracking interactions between the first customer 102A and the merchant at least while the first customer 102A is at the physical location of the merchant. In at least one example, the ticket associated with the first customer 102A can be stored locally on the first user computing device 106 and/or at one or more intermediary computing devices 116.

The intermediary computing device(s) 116 can comprise local server computing devices (e.g., associated with a merchant) and/or remote server computing devices (e.g., associated with a payment processing service). The intermediary computing device(s) 116 can store tickets and, among other things, facilitate notifications to other customers regarding opportunities to share items. Further, the intermediary computing device(s) 116 can process payments on behalf of the payment processing service and maintain accounts for merchants that use the payment processing service. The intermediary computing device(s) 116 can enable near real-time electronic menu management and/or notifications by enabling individual computing devices to transmit requests for items (or portions thereof) to the intermediary computing device(s) 116 and applying a particular set of rules (as described herein) to determine whether such items are available for sharing (or for another efficiency). That is, the intermediary computing device(s) 116 enable individually customizable filtering at a location remote from the user computing devices (e.g., 106, 108) by taking advantage of the technical capability of communication networks. Such communication networks are capable of leveraging customer data to personalize and customize communications with particular customers, as described herein. For instance, the intermediary computing device(s) 116 can utilize a filtering tool to target particular customers for sharing items, as described below. Additional details associated with such intermediary computing device(s) 116 are described below.

In at least one example, responsive to the first customer 102A indicating a desire to share an item, the first user computing device 106 can transmit a request indicating that the first customer 102A desires to share the item to the intermediary computing device(s) 116. For the purpose of this discussion, the request can be associated with an interrupt, call, data packet, or the like that is transmitted from the first user computing device 106 to the intermediary computing device(s) 116. Responsive to receiving the request, the intermediary computing device(s) 116 can transmit an instruction to the second user computing device 108 to cause the UI for order management 112 to update the menu in near real-time. For the purpose of this discussion, the instruction can be associated with an interrupt, call, data packet, or the like that is transmitted from the intermediary computing device(s) 116 to the second user computing device 108.

In at least one example, the second user computing device 108, e.g., via the UI for order management 112 described below, can apply a set of contextual rules to manipulate a menu into an updated menu 118. In some examples, the UI for order management 112 can apply the set of contextual rules in response to receiving the instruction and/or interactions between the second customer 102B and the merchant. That is, responsive to receiving the instruction to update the menu, the second user computing device 108 can apply the set of contextual rules to cause the previous menu (e.g., menu 114) to be updated to reflect that the item (e.g., Item C) is sharable. In other examples, the second user computing device 108 can apply the set of contextual rules dynamically.

In at least one example, the UI for order management 112 can receive the instruction and the UI for order management 112 can present an updated menu 118, which indicates that the item (e.g., Item C) is available to share (and a price associated with sharing the item). That is, the UI for order management 112 can present an updated menu 118 in near real-time. In some examples, the updated menu 118 can include an indication that an item is available for sharing. Of course, the graphical representation of the updated menu 118 is a non-limiting example of how an indication that an item is sharable is presented. In an alternative example, a selectable control can be presented proximate the sharable item. Or, the sharable item can be highlighted, animated, or otherwise modified to attract attention to the sharable item on the updated menu 118. In additional or alternative examples, the updated menu 118 can indicate a portion size (that is smaller than originally presented) and/or an updated price (that is less than the price originally presented). Further, in at least one example, the updated menu 118 can have a different configuration or layout. For instance, an item can be moved from a first portion of a menu (e.g., bottles, large plates, etc.) to a second portion of the menu (e.g., by the glass, small plates, etc.).

As described above, the menus (e.g., 114 and/or 118) can be configured according to the device on which they are displayed and can be manipulated based on dynamic tracking, creation, and availability of sub-items (e.g., portions of items), which change based on whether an item is available or available for sharing. Specific rules can be created to apply such manipulations (e.g., the menu may not be manipulated if the sub-item should be highlighted for sharing at a later time).

The second customer 102B can determine to share the item (e.g., Item C) with the first customer 102A. As such, the UI for order management 112 can add a split-item indication to a second ticket associated with the second customer 102B. In at least one example, responsive to the second customer 102B indicating a desire to share an item, the second user computing device 108 can transmit a request indicating that the second customer 102B desires to share the item to the intermediary computing device(s) 116. For the purpose of this discussion, the request can be associated with an interrupt, call, data packet, or the like that is transmitted from the second user computing device 108 to the intermediary computing device(s) 116. Responsive to receiving the request, the intermediary computing device(s) 116 can update the first ticket associated with the first customer 102A and/or transmit an instruction to the first user computing device 106 to cause the UI for order management 110 to update the first ticket. The first ticket can be updated to include a split-item indication that compliments the split-item indication added to the second ticket. In at least one example, the item on the first ticket can be replaced by the split-item indication. The cost of the split-items on each of the tickets (e.g., first ticket and second ticket) can sum to the total cost of the item.

Both customers 102 can otherwise interact with the merchant separately and the intermediary computing device(s) 116 (e.g., associated with a payment processing service) can process payments for the first ticket and the second ticket. In at least one example, the first customer 102A can pay for a portion of a cost of the item (which can be based on a portion size) and the second customer 102B can pay for a portion of the cost of the item (again, which can be based on a portion size). The intermediary computing device(s) 116 can deposit an amount of funds into an account of a merchant that is based on the cost of the item. The account of the merchant can be maintained by the payment processing service (e.g., for depositing funds received from POS transactions processed on behalf of the merchant).

FIG. 1 illustrates two customers 102. However, any number of customers can be present in the environment 100. In some examples, a subset of all of the customers present in the environment 100 can receive a notification that an item is sharable. In such examples, the subset can be determined based on customer data, as described below. In other examples, all of the customers present in the environment 100 can receive a notification that an item is sharable. In some examples, customers may not be present in a same physical location of a merchant, but may receive a notification based on their proximity to a physical location of a merchant. Or, in examples involving online merchants, customers can be notified of sharable items based on a characteristic other than location, such as a future appointment/reservation of the customer with the merchant, historical data to show that the customer has in the past shared the item or has otherwise consumed the item, or an explicit request from the customer requesting such notifications. The items can be shared at the same time as the first customer 102A that converted the menu item into sharable, or at a later time, e.g., when the second customer 102B arrives at the merchant location.

As described above, in at least one example, the first customer 102A and the second customer 102B can be at a same table or otherwise associated with a same ticket and, in such an example, the first ticket and the second ticket can be the same ticket. However, in an additional or alternative example, the first ticket and the second ticket can be separate tickets associated with a same table (e.g., in a split-ticket model).

Figure 2:
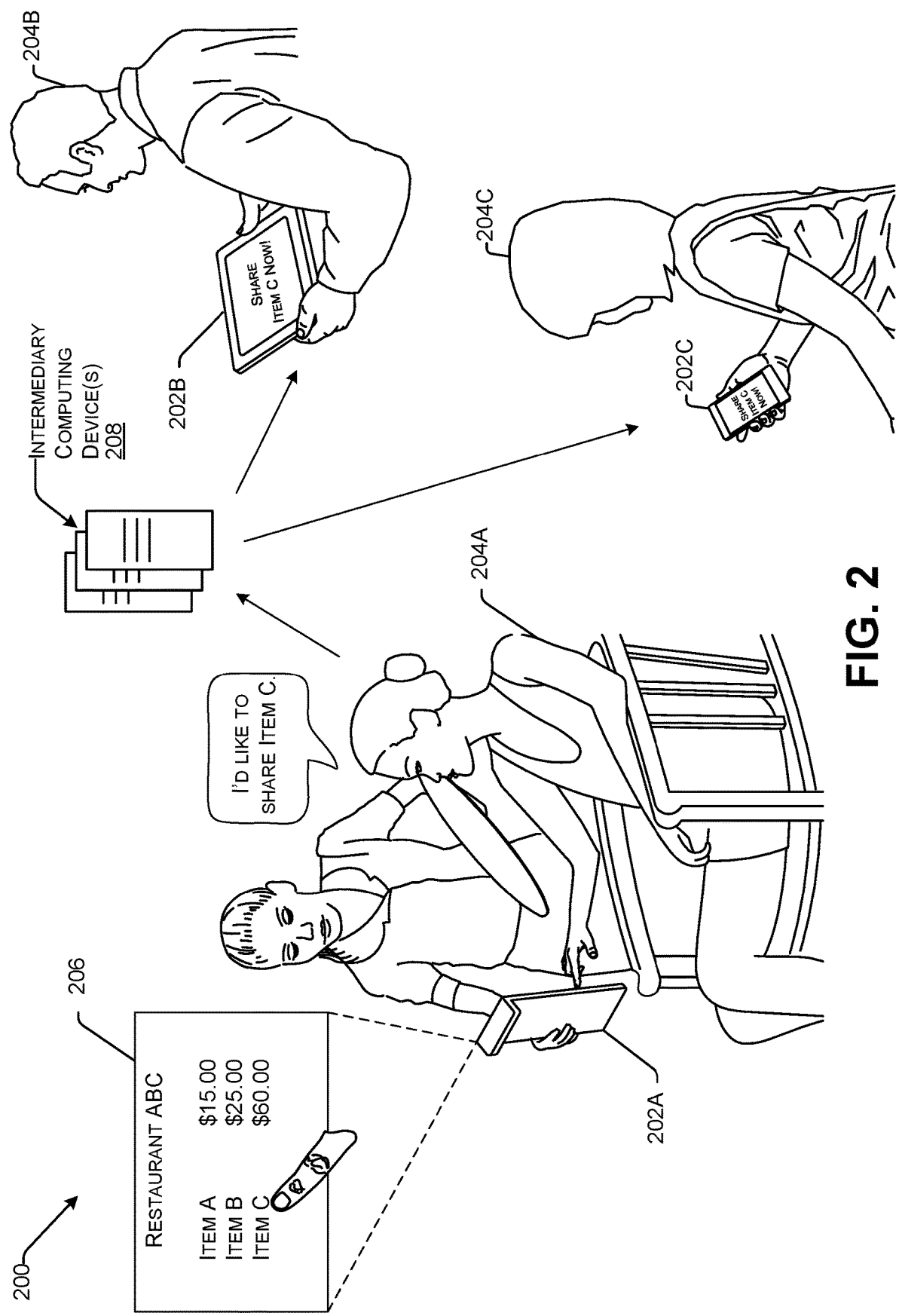
FIG. 2 illustrates an example environment for surfacing notifications to customers based on predicted efficiencies as described herein.

FIG. 2 illustrates an example environment 200 for surfacing notifications to customers based on predicted efficiencies as described herein. While FIG. 1 is directed to updating an electronic menu in near real-time to notify customer(s) that an item is available for sharing, in additional or alternative examples, customer(s) can be notified of such availability via other means such as via a push notification, a text message, an email, etc. FIG. 2 illustrates an example of such. The UIs for order management are not illustrated in FIG. 2, for ease of illustration. However, as with FIG. 1, each of the computing devices 202 (e.g., computing device 202A, computing device 202B, computing device 202C) can have a UI for order management available thereto.

In an example, a first customer 204A can interact with a first user computing device 202A to indicate that the first customer 204A desires to share an item on the menu 206 (e.g., Item C). In at least one example, responsive to the first customer 204A indicating a desire to share an item, the first user computing device 202A can transmit a request indicating that the first customer 204A desires to share the item to the intermediary computing device(s) 208. The intermediary computing device(s) 208 can correspond to the intermediary computing device(s) 116, as described above with reference to FIG. 1. As described above, the request can be associated with an interrupt, call, data packet, or the like that is transmitted from the first user computing device 202A to the intermediary computing device(s) 208. Responsive to receiving the request, the intermediary computing device(s) 208 can transmit a notification to the second user computing device 202B and the third user computing device 202C to notify the second customer 204B and the third customer 204C, respectively, that another customer desires to share an item (e.g., Item C). For the purpose of this discussion, the notification can be a push notification, text message, email, or the like that is transmitted from the intermediary computing device(s) to the second user computing device 202B and the third user computing device 202C.

In at least one example, a user computing device such as the second user computing device 202B and the third user computing device 202C, which can be operated by a customer (e.g., a customer computing device), can be associated with a UI for order management that can enable the second customer 204B and the third customer 201C to add item(s) to a ticket via an interaction with the second user computing device 202B and the third user computing device 202C, respectively. In some examples, the UI for order management can be presented via an instance of a customer application installed on a user computing device, which can be a mobile application or desktop application (e.g., provided by the payment processing service), or which can be an otherwise dedicated application. In an additional or alternative example, the UI for order management can be presented via a web browser, or the like, via a display of a user computing device. In at least one example, the customer application can offer additional or alternative ways for a respective customer 204B or 204C to interact with the merchant. For instance, a customer 204B or 204C can utilize the customer application to make reservations, place delivery orders, schedule appointments, participate in peer-to-peer payments, or otherwise interact with merchant(s) that are associated with the payment processing service. In some examples, the push notification can be pushed to the customer 204B, 204C via respective customer applications. Further, in some examples, a text message, an email, etc. can be sent to a phone number, email address, etc. associated with a customer profile enabling the customer to use the customer application.

FIG. 2 illustrates three customers 204. However, any number of customers can be present in the environment 200. In some examples, a subset of all of the customers (e.g., fewer than all) present in the environment 200 can receive a notification that an item is sharable. In such examples, the subset can be determined based on customer data, as described below. In other examples, all of the customers present in the environment 200 can receive a notification that an item is sharable (as shown in FIG. 2). In some examples, customers may not be present in a same physical location of a merchant, but may receive a notification based on their proximity to a physical location of a merchant. In such examples, the customer application can be used to determine whether a customer is present in or proximate to a physical location of a merchant. That is, the customer application can indicate a location of a customer, which can be used to determine whether the customer is present in or proximate to a physical location of a merchant. Or, in examples involving online merchants, customers can be notified of sharable items based on a characteristic other than location, as described above.

In at least one example, the second customer 204B and/or the third customer 204C can provide an input indicating that they would like to share the item with the first customer 204A. In some examples, depending on the portion size of the sharable item, both the second customer 204B and the third customer 204C can share the item with the first customer 204A. However, if the portion size of the item is two, either the second customer 204B or the third customer 204C may not be able to share the item with the first customer 204A. In such an example, the customer who indicated a desire to share the item first in time may be the customer who gets to share the item with the first customer 204A, the customer who offered a highest purchase price (e.g., an auction) may be the customer who gets to share the item with the first customer 204A, etc.

Much like what is described above with reference to FIG. 1, tickets can be used to track interactions between each of the customers 204 and the merchant. Each of the customers 204 can otherwise interact with the merchant separately and the intermediary computing device(s) 208 (e.g., associated with a payment processing service) can process payments for the first ticket, the second ticket, and so on. In at least one example, each customer that purchased a portion of the item can pay for a portion of a cost of the item (which can be based on a portion size). The intermediary computing device(s) 208 can deposit an amount of funds into an account of a merchant, maintained by the payment processing service, that is based on the cost of the item.

FIGS. 3-9 are flowcharts showing example methods involving techniques as described herein. The methods illustrated in FIGS. 3-9 are described with reference to FIGS. 1, 2, and FIGS. 10-12 below, for convenience and ease of understanding. However, the methods illustrated in FIGS. 3-9 are not limited to being performed using components described in FIGS. 1, 2, and FIGS. 10-12, and such components are not limited to performing the methods illustrated in FIGS. 3-9.

The methods 300-900 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 300-900 can be combined in whole or in part with each other or with other methods.

Figure 3:
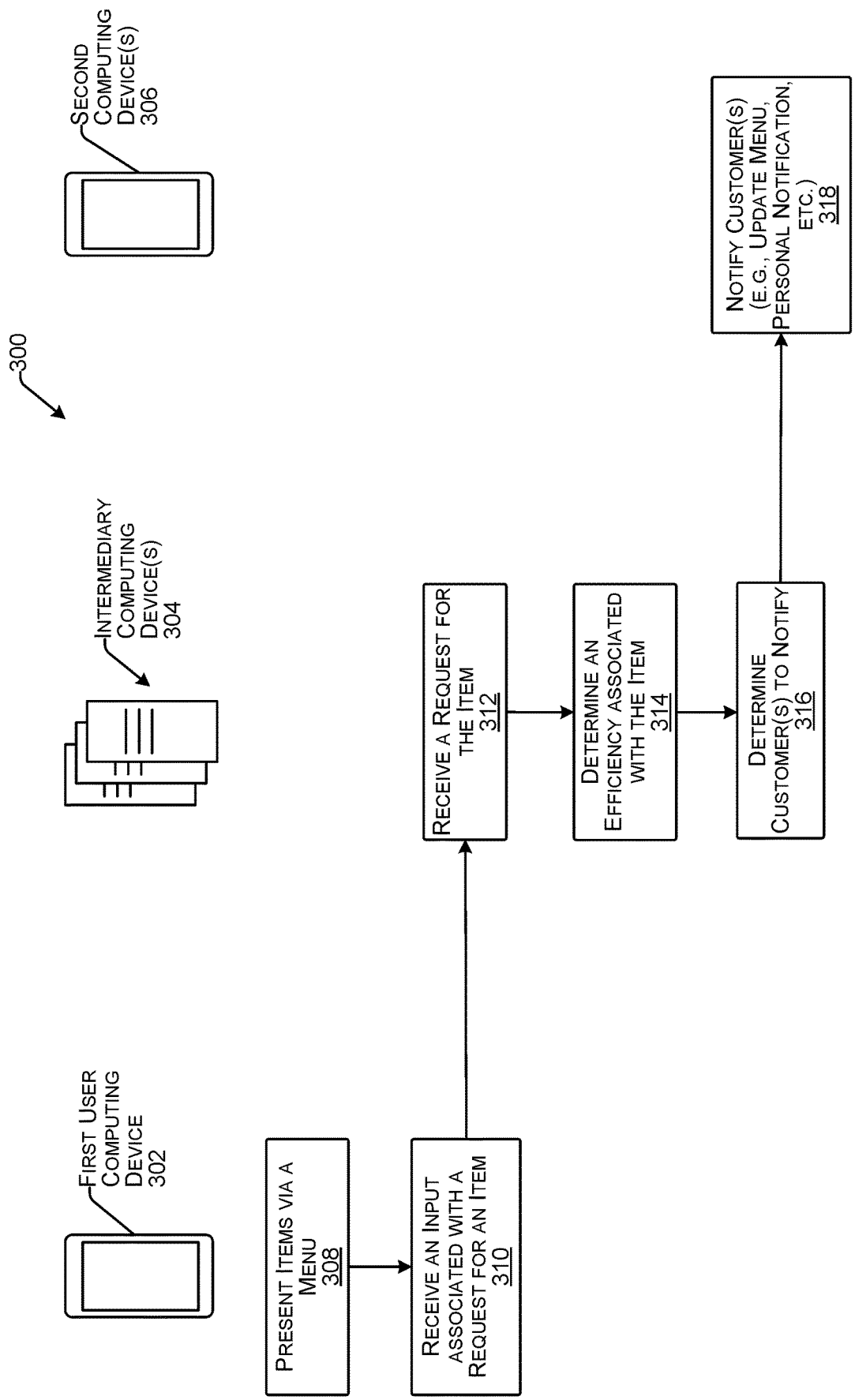
FIG. 3 illustrates an example process for notifying customer(s) about an efficiency associated with an item requested by another customer as described herein.

FIG. 3 illustrates an example process 300 for notifying customer(s) about an efficiency associated with an item requested by another customer as described herein. FIG. 3 includes three columns, each corresponding to operations performed by device(s) as designated: a first user computing device 302, intermediary computing device(s) 304, and second user computing device(s) 306. In at least one example, the first user computing device 302 and the second user computing device 306 can be merchant devices (e.g., owed by the merchant) or customer devices. Merchant devices can be computing devices that are owned by the merchant, but can be operated by customers, agents of the merchant, etc. Customer devices can be personal computing devices of the customers. Each user computing device 302, 306 can present a UI to enable order management. A UI for order management can be presented via a web browser, or the like, via a display of a computing device. In at least one example, a UI for order management can be presented via an application, such as a mobile application or desktop application, which is provided by the payment processing service, or which can be an otherwise dedicated application. User computing devices 106 and 108 are examples of the first user computing device 302 and the second user computing device(s) 306, respectively. Similarly, user computing device 202A and user computing devices 202B and 202C are examples of the first user computing device 302 and the second user computing device(s) 306, respectively.

The intermediary computing device(s) 304 can comprise local server computing devices (e.g., associated with a merchant) and/or remote server computing devices (e.g., associated with a payment processing service). The intermediary computing device(s) 304 can store tickets and, among other things, facilitate notifications to other customers regarding opportunities to share items. Further, the intermediary computing device(s) 304 can process payments on behalf of the payment processing service and maintain accounts for merchants that use the payment processing service. That is, the intermediary computing device(s) 304 can enable multiple customers to share an item and manage payment processing for transactions associated with each of the multiple customers on behalf of a merchant. Intermediary computing device(s) 116 and 208 are examples of intermediary computing device(s) 304. Additional details associated with such intermediary computing device(s) 304 are described below.

At operation 308, the first user computing device 302 presents items via a menu. In at least one example, the first user computing device 302 can present, via a UI for order management, a menu comprising one or more items that a merchant has available for sale. As described above, the menu can be an electronic menu presented via the UI for order management. In at least one example, the electronic menu can be interactive. For instance, the electronic menu can be a menu presented via a display that enables users (e.g., customers or merchants) to interact with the menu. For instance, individual items can be associated with selectable controls, the selection of which can indicate that a customer desires to order the corresponding items.

At operation 310, the first user computing device 302 receives an input associated with a request for an item. In at least one example, a user (e.g., an agent of a merchant, a customer, etc.) can interact with the UI for order management and can provide an input indicating that the customer desires to order an item. For instance, the user can select a selectable control associated with the item to indicate that the customer desires to order the item. Responsive to receiving the input, the first user computing device 302 can send a request for the item to the intermediary computing device(s) 304. As described above, the request can be associated with an interrupt, call, data packet, or like that is transmitted from the first user computing device 302 to the intermediary computing device(s) 304.

At operation 312, the intermediary computing device(s) 304 can receive a request for the item. In at least one example, the intermediary computing device(s) 304 can receive the request for the item from the first user computing device 302, and can determine an efficiency associated with the item, as illustrated at operation 314. In some examples, the intermediary computing device(s) 304 can determine whether the item is sharable (e.g., based on the request, based on inventory of a merchant, etc.). Additional details associated with determining whether an item is sharable are described below with reference to FIGS. 4-7. In additional or alternative examples, the intermediary computing device(s) 304 can determine whether the item can be combined with other items to streamline preparation or production. That is, the intermediary computing device(s) 304 can determine that two items can be combined to more efficiently prepare them together instead of individually. Or, the intermediary computing device(s) 304 can determine another efficiency available for the item (e.g., prevent spoilage, etc.). In some examples, the intermediary computing device(s) 304 can garner interest to determine whether customer(s) are interested in enabling an efficiency and, based on determining that more than a threshold number of customer(s) are interested in enabling the efficiency, can determine that the efficiency is available. For instance, if enough customers are interested in sharing an item, the computing device can determine that the item sharable.

At operation 316, the intermediary computing device(s) 304 can determine customer(s) to notify of the available efficiency. In at least one example, the intermediary computing device(s) 304 can analyze customer data associated with customers (e.g., using machine-trained models, statistical models, etc.) to identify target customers that are likely to be interested in sharing an item, or ordering another item (e.g., to streamline preparation and/or production), to achieve the intended efficiency. That is, in some examples, a selected group of customers that are predicted to be interested in sharing an item, or ordering another item, can be targeted with a notification regarding the opportunity. Additional details are provided below with reference to FIG. 8.

At operation 318, the second user computing device(s) 306 can notify customer(s) of the opportunity. In at least one example, the intermediary computing device(s) 304 can send an instruction or a notification to second user computing device(s) 306 to notify respective customer(s) of the opportunity to share an item, order another item, etc. As described above, in some examples, such an instruction can cause an electronic menu to be updated in near real-time and an updated electronic menu can be presented via a UI for order management on the second user computing device(s) 306. In additional or alternative examples, the notification can be sent to a personal device of the other customer(s), such as via a push notification, a text message, an email, etc. Additional details associated with managing the notifications and transactions (e.g., via tickets) are described below with reference to FIG. 9.

As described above, in some examples, an item can be associated with a condition after which the item is no longer sharable. In at least one example, the item can be made available for sharing for a time period and, after the time period lapses, the item may no longer be available for sharing. Or, the item can be portioned into a number of portion sizes and, after the number of portion sizes have been requested, the item may no longer be available for sharing. In such examples, customers can be notified that the item is no longer available to be shared and/or the updated menu can revert to the original presentation. In at least one example, just prior to the time period elapsing, a last-chance offer can be surfaced to customers (e.g., via their respective user computing devices) in an effort to encourage such customers to share the item.

Figure 4:
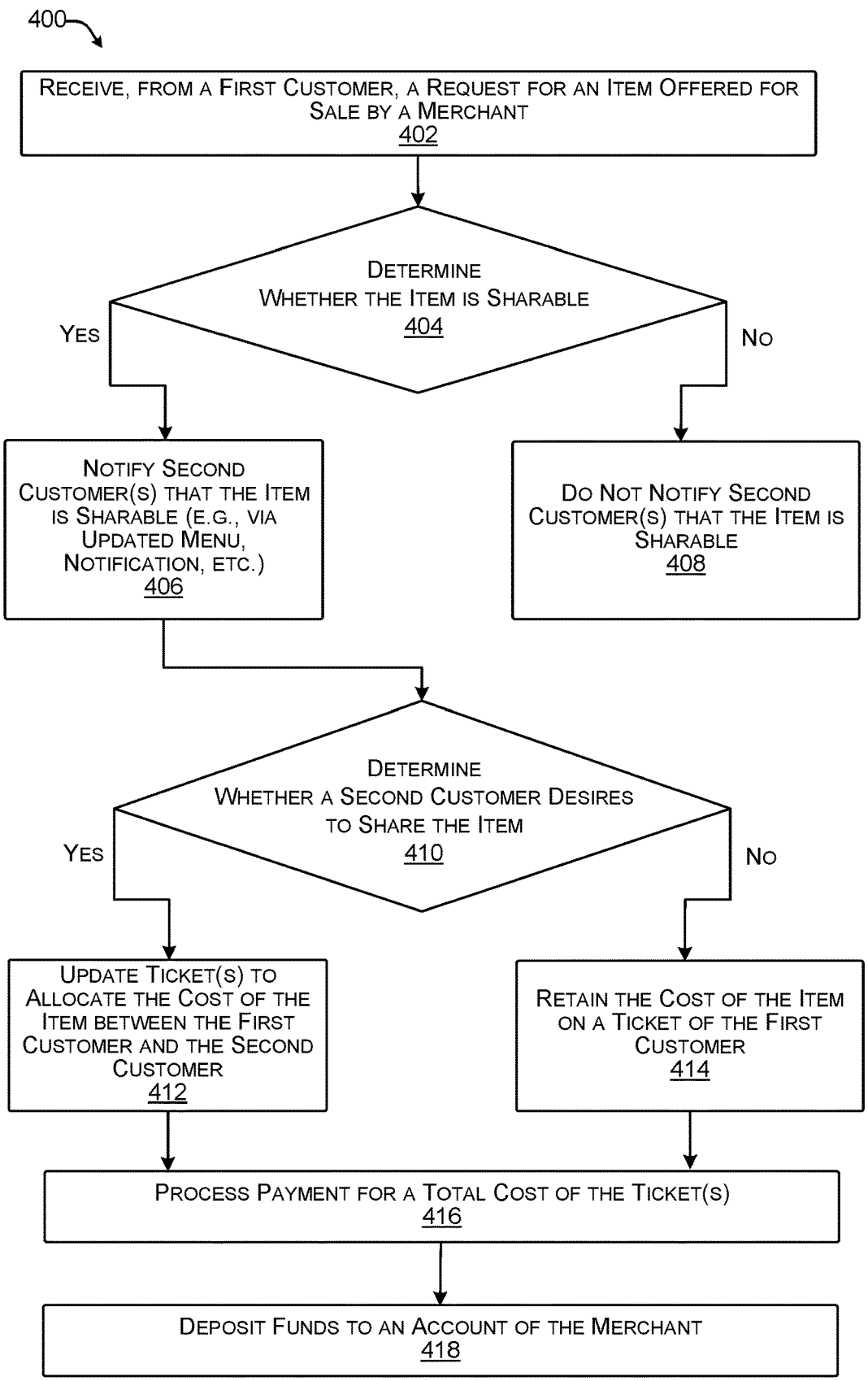
FIG. 4 illustrates an example process for notifying customer(s) about an efficiency associated with an item requested by another customer and/or processing payment for a sharable item as described herein.

FIG. 4 illustrates an example process 400 for notifying customer(s) about an efficiency associated with an item requested by another customer and/or processing payment for a sharable item as described herein. In some examples, operations described below can be performed by intermediary computing device(s). In an additional or alternative example, at least some operations can be performed by a user computing device that is in communication with the intermediary computing device(s) (e.g., in a distributed configuration).

At operation 402, one or more computing devices can receive, from a first customer, a request for an item offered for sale by a merchant. As described above, a UI for order management can present one or more items that can be acquired by a customer. In some examples, the UI for order management can present the items via an electronic menu. In at least one example, the electronic menu can be a menu presented via a display that enables users (e.g., customers or merchants) to interact with the menu. For instance, individual items can be associated with selectable controls, the selection of which can cause a corresponding item to be added to a ticket associated with a customer. As described above, a ticket can be a data structure that is used for tracking interactions between customer(s) and a merchant. In at least one example, a first customer can indicate a desire to order an item offered for sale by a merchant. For instance, the first customer (directly or via an agent of a merchant) can add the item to a ticket associated with the customer. In some examples, the request can indicate an explicit or implicit indication from the customer to divide the item into a smaller item. Responsive to receiving the indication, a first user computing device can send a request to intermediary computing device(s). As described above, for the purpose of this discussion, the request can be associated with an interrupt, call, data packet, or the like.

As described above, responsive to receiving the input, a UI for order management associated with the first user computing device can add the item to a ticket associated with the first customer. In some examples, a ticket can already exist, and, in such examples, the item can be added to the ticket. In other examples, the UI for order management can generate a ticket for the first customer. As described above, a "ticket" is a data structure that can be used for tracking interactions between a customer and a merchant. In some examples, the ticket can be used to track interactions while the customer is at a physical location of a merchant. In additional or alternative examples, the ticket can track interactions prior to a customer's arrival at a physical location and/or after a customer's departure from the physical location. In at least one example, the ticket can be used to track the addition of shareable and non-sharable items that a customer orders from a merchant. In at least one example, the ticket associated with the first customer can be stored locally on the first user computing device and/or at one or more intermediary computing devices.

At operation 404, a computing device of the one or more computing devices can determine whether the item is sharable. In at least one example, a computing device can access inventory data, as described below, associated with the merchant to determine whether the item is sharable. As described below with reference to FIG. 5, in some examples, a merchant can provide an input indicating that an item is sharable and an indicator of such can be stored in an inventory database associated with the merchant (and maintained by a payment processing service). In such examples, the merchant can also indicate a portion size associated with the (sharable) item, a number of portions associated with the item, a time period within which a subsequent request to share must be received after an initial request to share is received, etc. In some examples, responsive to receiving a request for an item, a computing device can access such data (stored in the inventory database) to determine whether the item is sharable, as described below with reference to FIG. 6. If the customer did not request to share the item, in some examples, the computing device can query the customer to determine whether the customer desires to share the item.

In some examples, the request can be received with an indication that the customer desires to share the item (e.g., the request is for a portion of the item). In at least one example, the computing device can access the inventory database to confirm that the item is sharable. If the inventory database does not indicate such, in some examples, the computing device can utilize machine-trained model(s) to predict whether the item can be shared. In such examples, machine-trained model(s) can be trained via a machine-learning mechanism (e.g., supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.) based on transaction data that indicates items previously shared by customers. In an additional or alternative example, the computing device can surface a request to an agent of the merchant seeking approval to make the item sharable. Additional details are described below with reference to FIG. 7.

At operation 406, a computing device of the one or more computing devices can notify second customer(s) that the item is sharable. Based at least in part on determining that the item is sharable, the computing device can send an instruction and/or a notification to other user computing device(s) to notify other customer(s) that the item is sharable. As described above, in some examples, the instruction can be provided via an interrupt, call, data packet, or the like and, upon receipt by the other user computing device(s), the other user computing device(s) can execute the instruction. In at least one example, the instruction can cause an update to an electronic menu, which can be made in near real-time. As described above, the UI for order management can update the menu based on the instruction and can present the updated menu. In another example, a notification can be sent to other user computing device(s), such as a push notification, a text message, an email, etc.

As described above, in some examples, all of the customers present in an environment (e.g., a physical location, a geofenced area, etc.) can receive a notification that an item is sharable. For instance, menus associated with such customers can be updated and/or such customers can receive personal notifications. In at least one example, a customer application associated with the payment processing service can be utilized to determine whether a customer is present in an environment. In other examples, a subset of all of the customers present in the environment (e.g., a physical location, a geofenced area, etc.) can receive a notification that an item is sharable. For instance, menus associated with the subset of customers can be updated and/or the subset of customers can receive personal notifications. In such examples, the subset can be determined based on customer data (e.g., using machine-trained models, statistical models, etc.), as described below with reference to FIG. 8.

At operation 408, a computing device of the one or more computing devices can refrain from notifying second customer(s) that the item is sharable. If the computing device determines that the item is not sharable, the computing device can refrain from notifying second customer(s).

At operation 410, a computing device of the one or more computing devices can determine whether a second customer desires to share the item. In at least one example, a second customer can opt to share the item with the first customer. In some examples, the second customer can provide an input (directly or via an agent of a merchant) that the second customer desires to share the item with the first customer. In some examples, the second customer can interact with an updated menu presented via a display of a device to indicate that the second customer desires to share the item with the first customer. In other examples, the second customer can reply to a personal notification sent to the second customer. Responsive to the input, a second user computing device can send, via an interrupt, call, data packet, or the like, an indication that the second user desires to share the item with the first customer.

At operation 412, a computing device of the one or more computing devices can update ticket(s) to allocate the cost of the item between the first customer and the second customer. Based on receiving an indication that the second customer desires to share the item with the first customer, the intermediary computing device(s) can allocate the cost of the item between the first customer and the second customer.

For instance, in at least one example, the UI for order management associated with the second user computing device can add a split-item indication to a second ticket associated with the second customer. In at least one example, responsive to the second customer indicating a desire to share an item, the second user computing device can transmit a request indicating that the second customer desires to share the item to the intermediary computing device(s). For the purpose of this discussion, the request can be associated with an interrupt, call, data packet, or the like that is transmitted from the second user computing device to the intermediary computing device(s). Responsive to receiving the request, the intermediary computing device(s) can update (or create) the second ticket associated with the first customer to include the split-item indication.

Responsive to receiving the request, the intermediary computing device(s) can update the first ticket associated with the first customer and/or transmit an instruction to the first user computing device to cause the UI for order management to update the first ticket. The first ticket can be updated to include a split-item indication that compliments the split-item indication added to the second ticket. In at least one example, the item on the first ticket can be replaced by the split-item indication. The cost of the split-items on each of the tickets (e.g., first ticket and second ticket) can sum to the total cost of the item and the amount allocated between the two tickets can be determined based on a portion size ordered by each of the customers.

At operation 414, a computing device of the one or more computing devices can retain the cost of the item on a ticket of the first customer. If a second customer does not opt to share the item, the first customer can remain responsible for the total cost of the item. As described above, in some examples, a customer can conditionally order the item such that if no other customers indicate a desire to share the item within a designated period of time, the customer can order another item instead of the item.

At operation 416, a computing device of the one or more computing devices can process payment for a total cost of the ticket(s). Both customers can otherwise interact with the merchant separately and, when the customers are ready to settle their tabs (e.g., close their tickets), the intermediary computing device(s) (e.g., associated with a payment processing service) can process payments for the first ticket and the second ticket. In at least one example, the first customer can pay for a portion of a cost of the item (which can be based on a portion size) and the second customer can pay for a portion of the cost of the item (again, which can be based on a portion size).

As noted above, in at least one example, the first customer and the second customer can be at different tables or otherwise not associated with the same ticket. In other examples, the first customer and the second customer can be at a same table or otherwise associated with a same ticket and, in such an example, the first ticket and the second ticket can be the same ticket. However, in an additional or alternative example, the first ticket and the second ticket can be separate tickets associated with a same table (e.g., in a split-ticket model).

At operation 418, a computing device of the one or more computing devices can deposit funds to an account of the merchant. In at least one example, the intermediary computing device(s) can deposit an amount of funds into an account of a merchant that is based on the cost of the item. In some examples, the intermediary computing device(s) can deposit an amount of funds into an account of a merchant that is equal to the cost of the item. In other examples, the intermediary computing device(s) can deposit an amount of funds into an account of a merchant that is less than the cost of the item (e.g., due to transaction processing fees, etc.).

Figure 5:
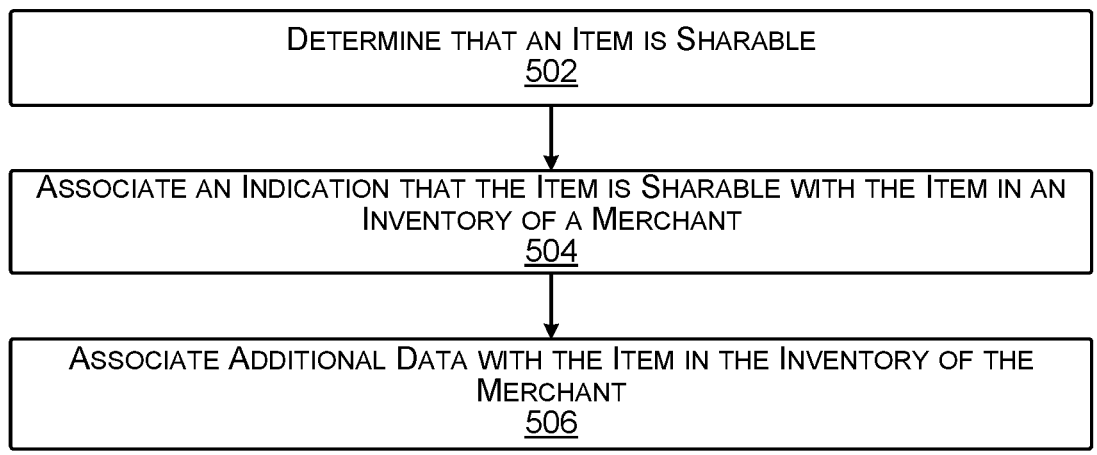
FIG. 5 illustrates an example process for associating data with an item in an inventory of a merchant as described herein.

FIG. 5 illustrates an example process 500 for associating data with an item in an inventory of a merchant as described herein. In some examples, operations described below can be performed by intermediary computing device(s). In at least one example, the intermediary computing device(s) can be associated with an inventory database storing data associated with inventory items that are offered for sale (or other means of acquisition) by merchants associated with the payment processing service. For instance, data associated with an item can include a description of the item, a price of the item, availability of the item, a count associated with the item, a portion size of the item, a number of portions available, an incentive associated with an item, a discount available for the item, taxes applicable to the item, a location of the item, image(s) of the item, characteristic(s) of the item, rules associated with the item etc.

At operation 502, a computing device of one or more computing devices can determine that an item is sharable or otherwise capable of being converted into sub-items of same or varying size or cost.

In at least one example, a merchant can interact with a computing device (e.g., via a POS graphical UI (GUI) or a dashboard) to indicate that an item in the merchant's inventory is sharable. In some examples, the merchant can interact with a toggle or selectable control to indicate that an item is sharable. In additional or alternative examples, the merchant can indicate a portion size associated with an item, thereby indicating that the item is sharable. Based on receiving such inputs, the computing device can determine that an item is sharable.

In some examples, the computing device can utilize machine-trained model(s) to determine that an item can be shared. In such examples, machine-trained model(s) can be trained via a machine-learning mechanism based on transaction data that indicates items previously shared by customers (as informed from POS transactions of one or more (different) merchants). In at least one example, the training data can comprise transaction data associated with multiple customers and one or more (different) merchants associated with the payment processing service. The machine-trained model(s) can output a metric (e.g., a score, etc.) indicating a likelihood that an item can be shared. If such a metric meets or exceeds a threshold, the computing device can determine that the item is sharable. Or, in some examples, the machine-trained model(s) can output a binary indicator (e.g., sharable or not sharable). While machine-learning mechanisms are described above, in some examples, a statistical model can be used to predict whether an item can be shared.

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, EINs, lines of business (in some examples), inventories (or at least portions thereof) and/or the like. That is, the use of the term "different merchants" does not refer to a merchant with various merchant locations or franchise/franchisee relationships.

At operation 504, a computing device of one or more computing devices can associate an indication that the item is sharable with the item in an inventory of a merchant. Based on determining that an item is sharable, the computing device can associate an indication that the item is sharable with an instance of the item in the inventory of the merchant. For instance, a flag or other indicator can be associated with the item such that when the item is ordered, the merchant can access information indicating whether that the item is sharable.

At operation 506, a computing device of one or more computing devices can associate additional data with the item in the inventory of the merchant. In at least one example, a merchant can provide additional data that can be associated with the item in the inventory of the merchant. As an example, the merchant can indicate a portion size associated with the item, a number of portions available for the item, a period of time after which a subsequent request to share an item must be received, a cost of a portion of an item, etc.

In some examples, such additional information can be inferred or automatically associated with the item in the inventory. In at least one example, an item type can determine the additional data (e.g., how long an item is presented, pricing scheme, etc.). Further, in at least one example, the computing device can analyze tickets associated with previous POS transactions of merchants (e.g., using machine-trained models, statistical models, etc.) and can predict a portion size of an item, a period of time after which a subsequent request to share an item must be received, a cost of a portion of an item, etc. In such examples, the POS transactions can be associated with different merchants that are associated with the payment processing service.

In some examples, such additional information can be updated in near real-time. For instance, kitchen data indicative of a rate at which food is being prepared in a kitchen can be used to dynamically adjust the period of time after which a subsequent request to share an item must be received. As a non-limiting example, if a kitchen is really busy, the period of time after which a subsequent request to share an item must be received can increase because it might take longer for the chef to make the item than if the kitchen is less busy. Or, if a kitchen is very slow, the period of time after which a subsequent request to share an item must be received can decrease because it might take less time for the chef to make the item (than normal). In an additional non-limiting example, a customer can specify the period of time, which can cause the period of time to be updated in near real-time. As another non-limiting example, a cost of a portion of an item can change in near real-time (e.g., reverse auction) in an effort to encourage other customers to share an item. For instance, as the time after a request to share an item increases without another customer accepting an offer to share the item, the cost of the other portion(s) of the item can decrease until the period of time the period of time after which a subsequent request to share an item must be received lapses. Alternatively, if multiple customers desire to share an item, the cost of another portion of an item can increase (e.g., an auction).

Figure 6:
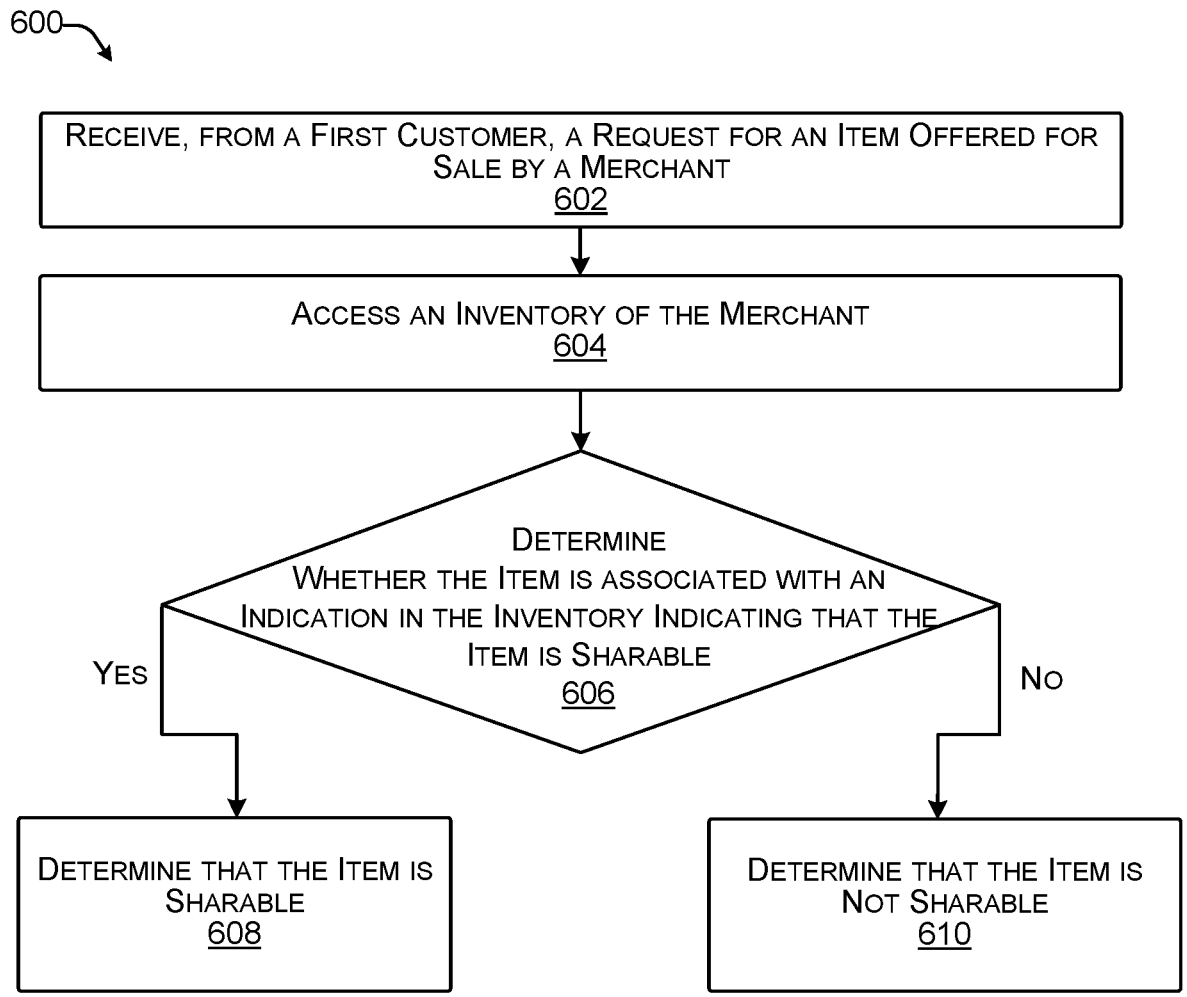
FIG. 6 illustrates an example process for determining whether an item is sharable as described herein.

FIG. 6 illustrates an example process 600 for determining whether an item is sharable as described herein. In some examples, operations described below can be performed by intermediary computing device(s).

At operation 602, a computing device of one or more computing devices can receive, from a first customer, a request for an item offered for sale by a merchant. As described above, a UI for order management can present one or more items that can be acquired by a customer. In some examples, the UI for order management can present the items via an electronic menu. In at least one example, the electronic menu can be a menu presented via a display that enables users (e.g., customers or merchants) to interact with the menu. For instance, individual items can be associated with selectable controls, the selection of which can cause a corresponding item to be added to a ticket associated with a customer. As described above, for the purpose of this discussion, the request can be associated with an interrupt, call, data packet, or the like. In some examples, the request can indicate an explicit or implicit indication from the first customer to divide the item into a smaller item.

At operation 604, a computing device of the one or more computing devices can access an inventory of the merchant. As described above, in at least one example, the intermediary computing device(s) can be associated with an inventory database storing data (e.g., "inventory data") associated with inventory items that are offered for sale (or other means of acquisition) by merchants associated with the payment processing service. For instance, inventory data associated with an item can include a description of the item, a price of the item, a discount available for the item, taxes applicable to the item, a location of the item, image(s) of the item, characteristic(s) of the item, etc. Responsive to receiving the request, the computing device can access the inventory database to access the inventory of the merchant.

At operation 606, a computing device of the one or more computing devices can determine whether the item is associated with an indication in the inventory indicating that the item is sharable. As described above, a merchant can interact with a computing device (e.g., via a POS graphical UI (GUI) or a dashboard) to indicate that an item in the merchant's inventory is sharable, or a computing device can infer that an item is sharable. Based on receiving an indication that an item is sharable, the computing device can associate an indication that the item is sharable with an instance of the item in the inventory of the merchant. For instance, a flag or other indicator can be associated with the item such that when the item is ordered, the merchant can access information indicating whether that item is sharable.

In an example, the computing device can perform a lookup or otherwise search the inventory database to determine whether an item is sharable. Based on determining that the item is associated with a flag or other indicator, the computing device can determine that the item is sharable, as shown at operation 608. Based on determining that the item is not associated with a flag or other indicator, the computing device can determine that the item is not sharable, as shown at operation 610.

Figure 7:
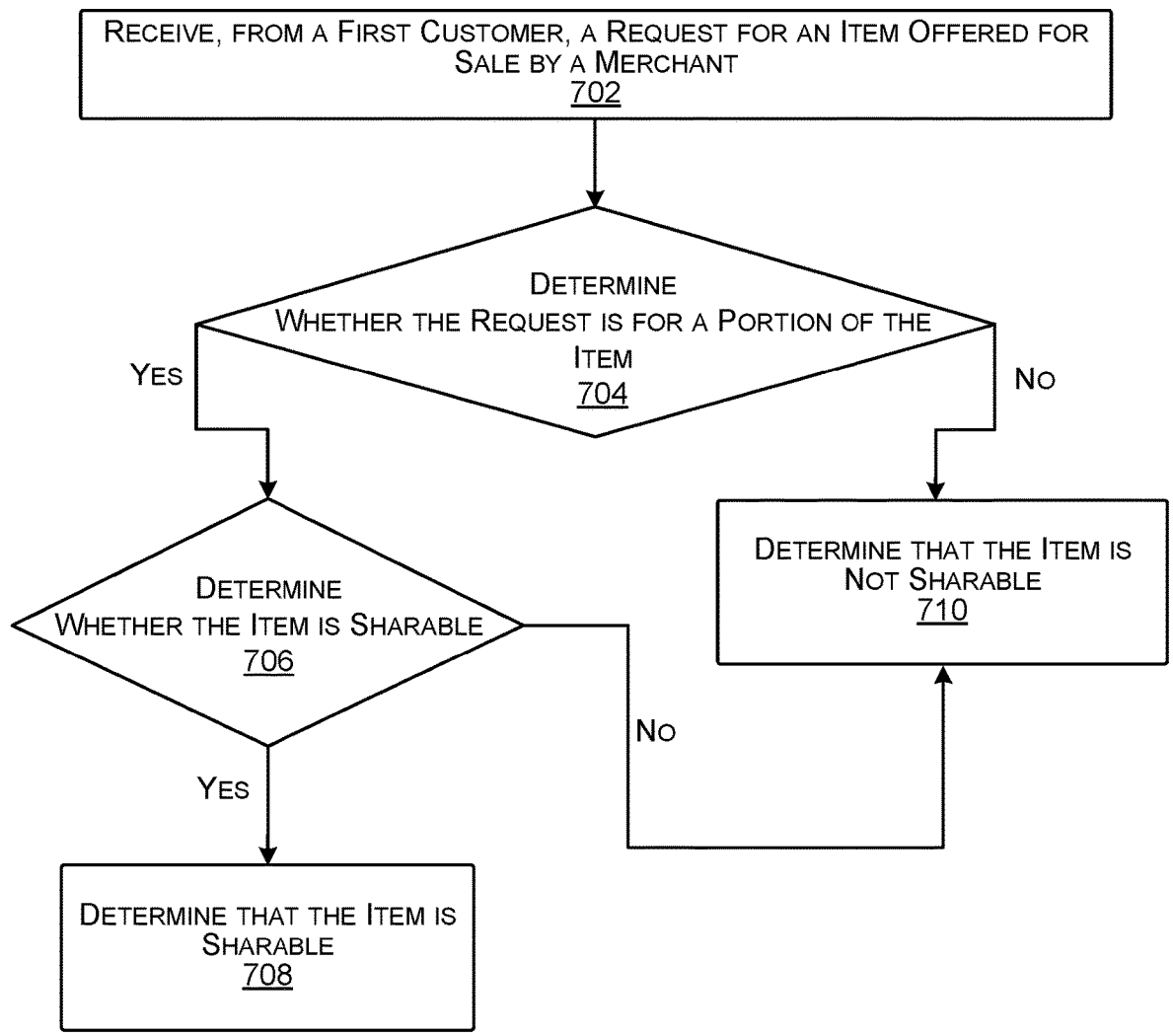
FIG. 7 illustrates an example process for determining whether an item is sharable as described herein.

FIG. 7 illustrates an example process 700 for determining whether an item is sharable as described herein. In some examples, operations described below can be performed by intermediary computing device(s).

At operation 702, a computing device of one or more computing devices can receive, from a first customer, a request for an item offered for sale by a merchant. As described above, a UI for order management can present one or more items that can be acquired by a customer. In some examples, the UI for order management can present the items via an electronic menu. In at least one example, the electronic menu can be a menu presented via a display that enables users (e.g., customers or merchants) to interact with the menu. For instance, individual items can be associated with selectable controls, the selection of which can cause a corresponding item to be added to a ticket associated with a customer. As described above, for the purpose of this discussion, the request can be associated with an interrupt, call, data packet, or the like. In some examples, the request can indicate an explicit or implicit indication from the first customer to divide the item into a smaller item.

At operation 704, a computing device of one or more computing devices can determine whether the request is for a portion of the item. In some examples, the request can be received with an indication that the customer desires to share the item (e.g., the request is for a portion of the item). In such an example, the computing device can determine that the request is for a portion of the item based on such an indication.

At operation 706, a computing device of one or more computing devices can determine whether the item is sharable. In at least one example, the computing device can access the inventory database to confirm that the item is sharable. That is, the computing device can determine whether the item is associated with a flag or other indicator indicating that the item is sharable.

If the inventory database does not indicate such, in some examples, the computing device can utilize machine-trained model(s) to predict whether the item can be shared. In such examples, machine-trained model(s) can be trained via a machine-learning mechanism based on transaction data that indicates items previously shared by customers (as informed from POS transactions of one or more (different) merchants). As described above, in at least one example, the training data can comprise transaction data associated with multiple customers and one or more (different) merchants associated with the payment processing service. The machine-trained model(s) can output a metric (e.g., a score, etc.) indicating a likelihood that an item can be shared. If such a metric meets or exceeds a threshold, the computing device can determine that the item is sharable. Or, in some examples, the machine-trained model(s) can output a binary indicator (e.g., sharable or not sharable). While machine-learning mechanisms are described above, in some examples, a statistical model can be used to predict whether an item can be shared.

In an additional or alternative example, the computing device can surface a request to an agent of the merchant seeking approval to make the item sharable.

Further, in some examples, based on receiving the request for the portion of the item, the computing device can determine whether there are any other customers interested in a portion of the item. For instance, one or more other customers may have indicated an interest in a portion of the item (e.g., in association with a reservation, via an interaction with an electronic menu, etc.), and, based at least in part on determining that two or more customers are interested in portions of the item, the computing device can determine that the item is sharable.

Based at least in part on determining that the item is associated with an indicator indicating that the item is sharable, an output of a machine-trained model and/or statistical model indicating that the item is sharable, an explicit indication from an agent of the merchant indicating that the item is sharable, and/or multiple requests for multiple portions of an item, the computing device can determine that the item is sharable, as illustrated at operation 708.

If the request is not for a portion of the item and/or the item is not associated with an indicator indicating that the item is sharable, an output of a machine-trained model and/or statistical model does not indicate that the item is sharable, an explicit indication from an agent of the merchant indicates that the item is not sharable, and/or there are not multiple requests for multiple portions of an item, the computing device can determine that the item is not sharable, as illustrated at operation 710.

Figure 8:
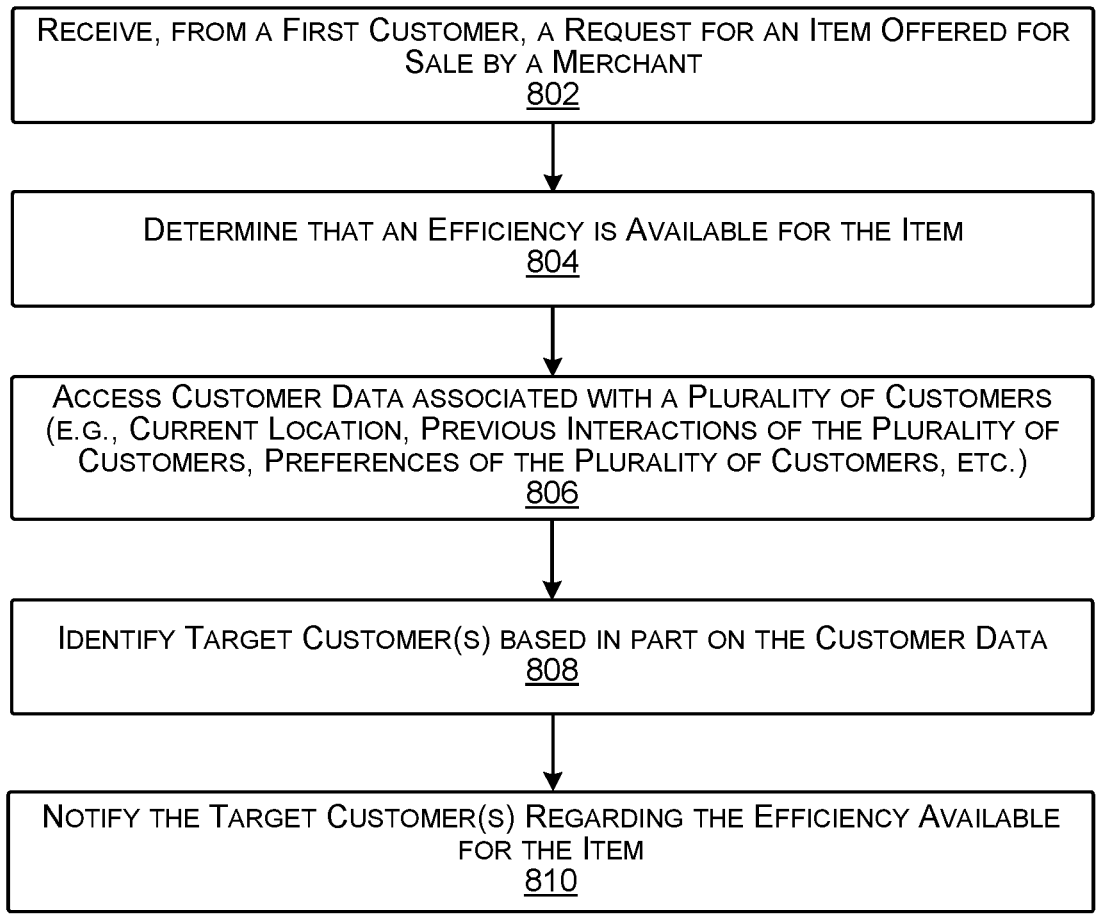
FIG. 8 illustrates an example process for identifying target customer(s) as described herein.

FIG. 8 illustrates an example process 800 for identifying target customer(s) as described herein. In some examples, operations described below can be performed by intermediary computing device(s).

At operation 802, a computing device of one or more computing devices can receive, from a first customer, a request for an item offered for sale by a merchant. As described above, a UI for order management can present one or more items that can be acquired by a customer. In some examples, the UI for order management can present the items via an electronic menu. In at least one example, the electronic menu can be a menu presented via a display that enables users (e.g., customers or merchants) to interact with the menu. For instance, individual items can be associated with selectable controls, the selection of which can cause a corresponding item to be added to a ticket associated with a customer. As described above, for the purpose of this discussion, the request can be associated with an interrupt, call, data packet, or the like. The request can further indicate an explicit or implicit indication from the first customer to divide the item into a smaller item.

At operation 804, a computing device of one or more computing devices can determine that an efficiency is available. In some examples, the computing device can determine whether the item is sharable (e.g., based on the request, based on inventory of a merchant, etc.), as described above with respect to FIGS. 6 and 7. In additional or alternative examples, the computing device can determine whether the item can be combined with other items to streamline preparation or production. That is, the computing device can determine that two items can be combined to more efficiently prepare them together instead of individually. For instance, the computing device can determine that, by combining two or more items, preparation time, required ingredients, number of employees, or the like can be reduced by more than a threshold. Or, the computing device can determine another efficiency available for the item. For instance, the computing device can determine that, a cost associated with promoting particular items with an impending spoilage date or indication, can result in a savings above a threshold.

At operation 806, a computing device of one or more computing devices can access customer data associated with a plurality of customers. In at least one example, the intermediary computing devices can be associated with a customer database storing customer profiles associated with customers (e.g., of merchants that utilize the payment processing service). A customer profile can be associated with customer data ("characteristics") (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), sharing history (e.g., items previously shared, previous requests to share an item (fulfilled or unfulfilled), etc.), customer service data, etc. Additional or alternative customer data can be stored in the customer profiles. In at least one example, the computing device can access customer data from the customer database.

In some examples, the computing device can access information associated with an upcoming reservation (which may or may not be stored in association with a customer profile). As described above, the customer profile can indicate upcoming reservations. In an example, the computing device can use such reservation data to determine when a particular customer is at a physical location of a restaurant (e.g., during the reservation) and/or when the particular customer is en route to the physical location of the restaurant. In at least one example, location data associated with a user computing device (having a customer application stored thereon) associated with the customer can be used to confirm that the customer is in the physical location of the restaurant or en route to the physical location of the restaurant. In some examples, a customer can provide information prior to arriving at the physical location of the merchant and such information can be associated with the reservation (and, in some examples, a data structure representative thereof). For instance, a customer can indicate a willingness to share, a number of other customers in the reservation that are willing to share, a dollar amount the customer(s) are willing to spend for portion(s) of item(s), etc.

At operation 808, a computing device of one or more computing devices can determine, based at least in part on the customer data, target customer(s). In at least one example, the computing device can analyze the customer data to identify one or more customers that are likely to be interested in sharing an item or ordering an item (or portion thereof) to otherwise contribute to the identified efficiency. For the purpose of this discussion, such customers can be called "target customers." As non-limiting examples, target customers can be customers are likely to participate in sharing items or ordering an item (or portion thereof) to otherwise contribute to the identified efficiency. In some examples, target customers can be proximate to the customer desiring to share an item. For the purpose of this discussion, "proximate" can refer to a location within a same physical location (e.g., same restaurant, same retail store, etc.), a location within a geofence (e.g., close enough to a physical location such that the customer could share the item), etc. In at least one example, a location of a customer can be determined by a location of a user computing device with an instance of a customer application associated with the payment processing service (as described above) stored thereon.

In some examples, various filters can be used (e.g., location, history of sharing, etc.) to identify target customers. In additional or alternative examples, machine-trained model(s) can be trained via a machine-learning mechanism based on customer data associated with customer profiles. The machine-trained model(s) can be used to analyze customer profile data to output a metric (e.g., a score, etc.) indicating a likelihood that a customer is interested in sharing an item (or otherwise ordering an item to drive an efficiency). If such a metric meets or exceeds a threshold, the computing device can determine that a corresponding customer is a target customer. Or, in some examples, the machine-trained model(s) can output a binary indicator (e.g., interested or not interested). While machine-learning mechanisms are described above, in some examples, a statistical model can be used to predict whether an item can be shared.

At operation 810, a computing device of one or more computing devices can notify the target customer(s) regarding the efficiency available for the item. Based at least in part on determining one or more target customers, the computing device can notify the target customer(s) of the available efficiency. For instance, as described above, in some examples, an electronic menu can be updated in near real-time to indicate that an item is available for sharing (and, in some examples, can indicate a reduced cost of the item). In at least one example, an electronic menu can be presented via a computing device that is operable by a customer and/or an agent of a merchant (e.g., for instance at a table). In an additional or alternative example, an electronic menu can be presented via a computing device that displays that information to multiple customers at one time (e.g., a television, an electronic board, etc.). In some examples, techniques described herein can be directed to sending a notification to a personal device of a customer (e.g., a push notification, a text message, an email, etc.), as described above. In some examples, the notification (e.g., update, etc.) can be triggered in a batch manner across devices associated with the target customers.

As described above, at least some of the operations described above with reference to FIG. 8 can be performed by intermediary computing device(s). Further, as described above, the intermediary computing device(s) can enable near real-time electronic menu management and/or notifications by enabling individual computing devices to transmit requests for items (or portions thereof) to the intermediary computing device(s) and applying a particular set of rules (as described herein) to determine whether such items are available for sharing (or for another efficiency). That is, the intermediary computing device(s) enable individually customizable filtering at a location remote from the user computing devices by taking advantage of the technical capability of communication networks. Such communication networks are capable of leveraging customer data to personalize and customize communications with particular customers, as described herein. For instance, the intermediary computing device(s) can utilize a filtering tool to target particular customers for sharing items, as described above with reference to operations 802-810.

Figure 9:
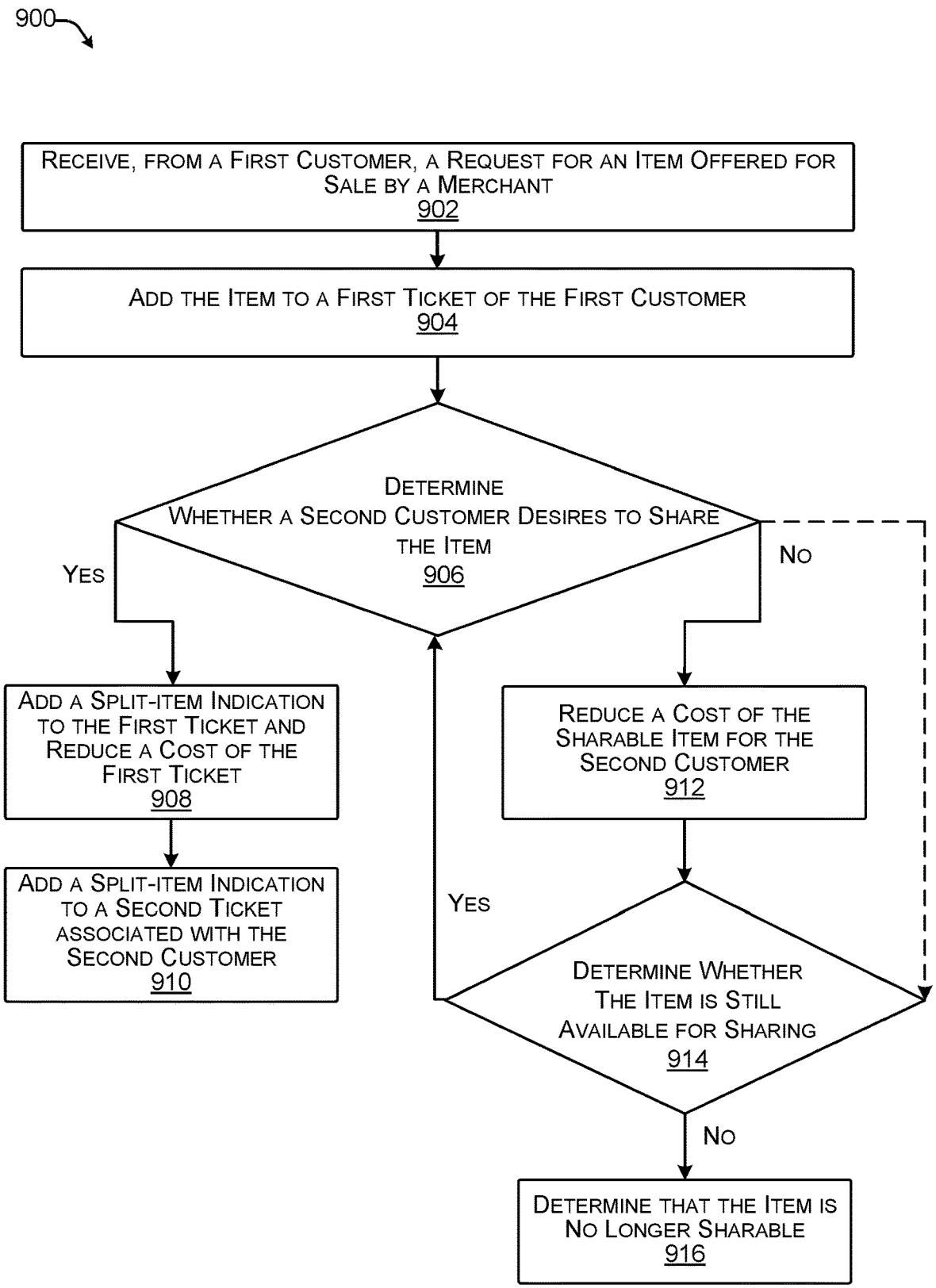
FIG. 9 illustrates an example process for facilitating ordering and/or payment of sharable items as described herein.

FIG. 9 illustrates an example process 900 for facilitating ordering and/or payment of sharable items as described herein. In some examples, operations described below can be performed by intermediary computing device(s). In an alternative example, at least some operations can be performed by a user computing device that is in communication with the intermediary computing device(s) (e.g., in a distributed configuration).

At operation 902, a computing device of one or more computing devices can receive from a first customer, a request for an item offered for sale by a merchant. As described above, a UI for order management can present one or more items that can be acquired by a customer. In some examples, the UI for order management can present the items via an electronic menu. In at least one example, the electronic menu can be a menu presented via a display that enables users (e.g., customers or merchants) to interact with the menu. For instance, individual items can be associated with selectable controls, the selection of which can cause a corresponding item to be added to a ticket associated with a customer. As described above, for the purpose of this discussion, the request can be associated with an interrupt, call, data packet, or the like.

At operation 904, a computing device of one or more computing devices can add the item to a first ticket of the first customer. Responsive to receiving the input, the UI for order management can add the item to a ticket (e.g., the first ticket) associated with the first customer. In some examples, a ticket can already exist, and, in such examples, the item can be added to the ticket. In other examples, the UI for order management can generate a ticket for the first customer. As described above, a "ticket" is a data structure that can be used for tracking interactions between a customer and a merchant (and/or multiple customers and a merchant). In some examples, the first ticket can be used to track interactions while the first customer is at a physical location of a merchant. In additional or alternative examples, the first ticket can track interactions prior to a first customer's arrival at a physical location and/or after a first customer's departure from the physical location. In at least one example, the first ticket can be stored on a user computing device or at intermediary computing device(s). In some examples, the first ticket can be stored on a user computing device and a duplicate can be stored at the intermediary computing device(s). In at least one example, the first ticket can be used to track the addition of shareable and non-sharable items that the first customer orders from a merchant.

At operation 906, a computing device of one or more computing devices can determine whether a second customer desires to share the item. As described above, in at least one example, based at least in part on determining one or more second customers (e.g., target customers), the computing device can notify the second customer(s) that an item is available to share. For instance, as described above, in some examples, an electronic menu can be updated in near real-time to indicate that an item is available for sharing (and, in some examples, can indicate a reduced cost of the item). In at least one example, an electronic menu can be presented via a computing device that is operable by a customer and/or an agent of a merchant (e.g., for instance at a table). In an additional or alternative example, an electronic menu can be presented via a computing device that displays that information to multiple customers at one time (e.g., a television, an electronic board, etc.). In some examples, techniques described herein can be directed to sending a notification to a personal device of a customer (e.g., a push notification, a text message, an email, etc.).

In at least one example, a second customer can opt to share the item with the first customer. In some examples, the second customer can provide an input (directly or via an agent of a merchant) that the second customer desires to share the item with the first customer. In some examples, the second customer can interact with an updated menu presented via a display of a device to indicate that the second customer desires to share the item with the first customer. In other examples, the second customer can reply to a personal notification sent to the second customer. Responsive to the input, a second user computing device can send, via an interrupt, call, data packet, or the like, an indication that the second user desires to share the item with the first customer.

At operation 908, a computing device of one or more computing devices can add a split-item indication to the first ticket. Responsive to receiving an indication that a second customer desires to share the item, the computing device can update the first ticket associated with the first customer. The first ticket can be updated to include a split-item indication. That is, the split-item indication can replace the item associated with the first ticket. Responsive to updating the first ticket, the total of the first ticket can be updated to reflect the modification.

At operation 910, a computing device of one or more computing devices can add a split-item indication to a second ticket associated with the customer. In at least one example, the computing device can add a split-item indication to a second ticket associated with the second customer. In at least one example, the cost of the split-items on each of the tickets (e.g., first ticket and second ticket) can sum to the total cost of the item. In some examples, multiple second customers can opt to share the item, so long as the item can accommodate multiple portions. In such an example, tickets associated with each customer can be updated to reflect the split-item and the cost of the split-items can sum to the total cost of the item.

At operation 912, a computing device of one or more computing devices can reduce a cost of the sharable item for the second customer. In at least one example, if a second customer has not opted to share the item with the first customer, the computing device can reduce the cost of the item. In some examples, the cost can be reduced by a percentage, a predetermined amount, etc., which in some examples, can be based on portion sizes ordered by the first customer and the second customer. In additional or alternative examples, the computing device can otherwise incentivize sharing of the item in any other way, such as by reducing the cost of other items ordered by the customer, offering items to pair with the item that are otherwise not available, and so on.

At operation 914, a computing device of one or more computing devices, can determine whether the item is still available for sharing. In at least one example, after the cost of the item has been reduced, the computing device can determine whether the item is still available for sharing. In such an example, the computing device can determine whether the item is still available for sharing after a lapse of a period of time, at a particular frequency, etc. In some examples, the item can still be available for sharing if the period of time after which a subsequent request must be received has not yet lapsed. If the item is still available for sharing, process 900 can return to operation 906. In some examples, in the event a second customer still has not opted to share the item, the cost of the sharable item can be reduced again.

In some examples, process 900 can proceed from operation 906 to operation 914 without reducing the cost of the sharable item. That is, in such examples, based on determining that a second customer has not indicated a desire to share an item, a computing device of the one or more computing devices can determine whether the item is still available for sharing. As described above, in some examples, an item can be associated with a condition after which the item is no longer sharable. In at least one example, the item can be made available for sharing for a time period and, after the time period lapses, the item may no longer be available for sharing. In some examples, the time period can be designated by a customer (the ordering customer or targeted customers). Or, the item can be portioned into a number of portion sizes and, after the number of portion sizes have been requested, the item may no longer be available for sharing.

At operation 916, a computing device of one or more computing devices can determine that the item is no longer sharable. In at least one example, the computing device can determine that the item is no longer sharable and, in such an example, customers can be notified that the item is no longer available to be shared and/or the updated menu can revert to the original presentation. In at least one example, just prior to the time period elapsing, a last-chance offer can be surfaced to customers (e.g., via their respective user computing devices) in an effort to encourage such customers to share the item.

If an item is no longer sharable, and the period of time for receiving the subsequent request has passed, the first customer can be responsible for paying the total cost of the item, unless the first customer ordered the item conditional on another customer sharing the item with him/her. If the customer ordered the item conditional on another customer sharing the item with him/her, and an item is no longer sharable, an agent of the merchant can reach out to the customer to determine whether the customer still wants to order the item. In some examples, the agent can reach out to the customer personally or electronically (e.g., via a user computing device).

In some examples, a portion of an item can be sold (e.g., to the first customer) prior to another customer requesting the item, and can be (available via and) delivered to the customer in the physical location of the merchant. If the remaining portion(s) of the item are not requested, a notification can be pushed to a delivery service provider (e.g., GrubHub®, Caviar®, UberEats®, etc.) to allow online customers order the remaining portion(s) of the item. In at least one example, such remaining portion(s) can be offered at a discount or can otherwise have an incentive associated therewith.

In at least one example, a computing device of the one or more customer devices can utilize a timer to track time between agent interactions with customers. In some examples, as the end of the period of time within which a subsequent request must be received to share an item approaches (e.g., is within a threshold period of the current time), the computing device can notify the agent to reach out to the customer. The timer can be used for other purposes, as well. For instance, in an example, if an agent of a merchant has not interacted with a particular customer for more than a threshold period of time, the computing device can notify the agent to reach out to the customer.

Further, the timer can be used to inform a computing device of the one or more computing devices when to update menus. For instance, in at least one example, a computing device can utilize time tracked by the timer to update an electronic menu from appetizers to main courses and main courses to desserts. That is, if a computing device determines that a ticket associated with a table has been open more than a first threshold period of time, the computing device can cause an electronic menu to transition to presenting main course items, and if the ticket has been open more than a second threshold period of time, the computing device can cause an electronic menu to be updated to present dessert items.

In some examples, an item can be shared between multiple customers. In such examples, process 900 can be repeated for each available portion of the item.

Figure 10:
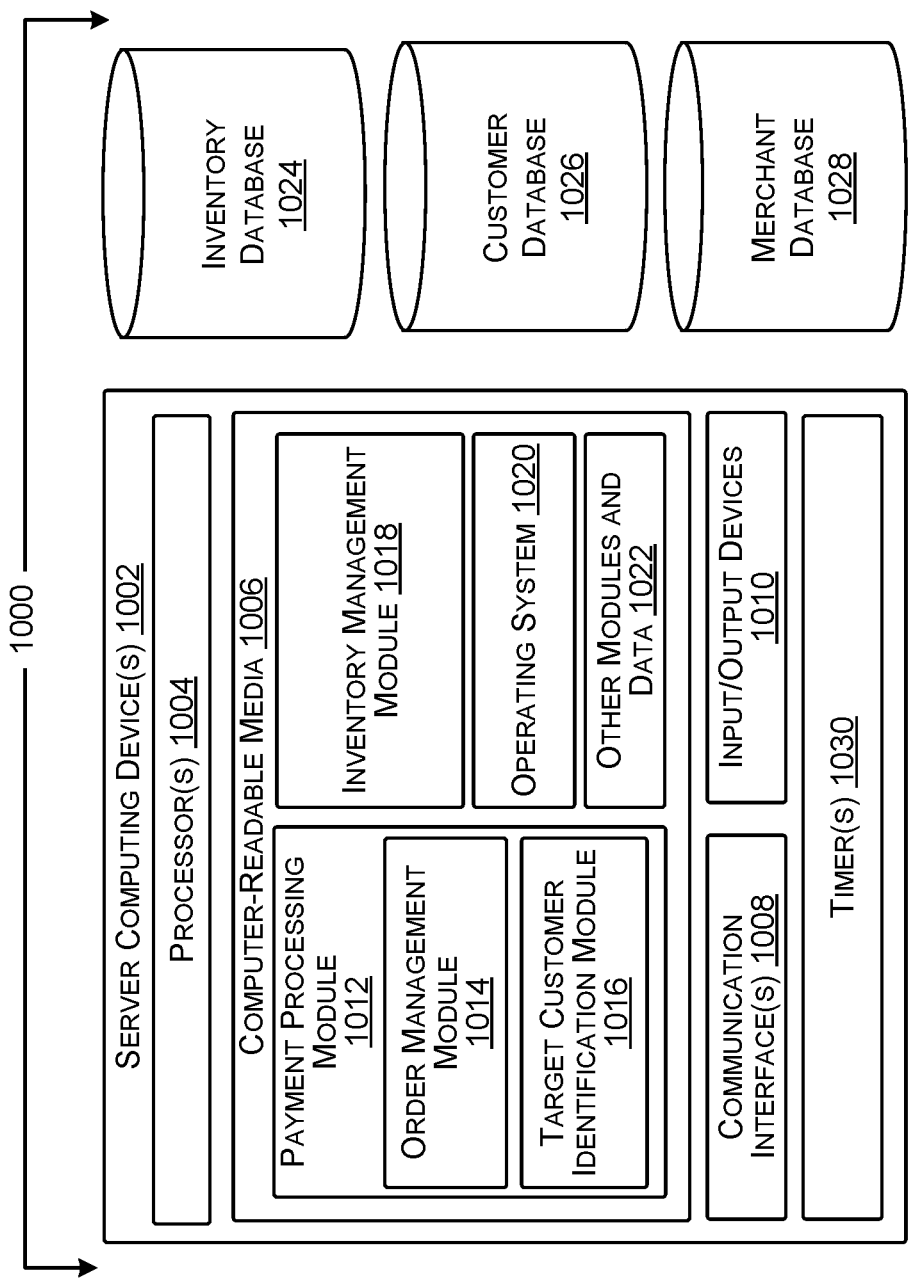
FIG. 10 illustrates an example server computing device for performing techniques as described herein.

FIG. 10 illustrates an example server computing system 1000 for performing techniques as described herein. As described above, one or more user computing devices can communicate with one or more intermediary computing devices. In at least one example, the server computing system 1000 can correspond to the one or more intermediary computing devices. As described above, the server computing system 1000 can comprise local server computing devices (e.g., associated with a merchant) and/or remote server computing devices (e.g., associated with a payment processing service).

The server computing device(s) 1002 ("server(s)" hereinafter) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1002 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 1002 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1002 can include one or more processors 1004, one or more computer-readable media 1006, one or more communication interfaces 1008, and one or more input/output devices 1010. Each processor 1004 can be a single processing unit or a number of processing units, and can include single or multiple computing units or multiple processing cores. The processor(s) 1004 can be implemented as one or more microprocessors, microcomputers, microcontrollers, digital signal processors, central processing units, state machines, logic circuitries, and/or any devices that manipulate signals based on operational instructions. For example, the processor(s) 1004 can be one or more hardware processors and/or logic circuits of any suitable type specifically programmed or configured to execute the algorithms and processes described herein. The processor(s) 1004 can be configured to fetch and execute computer-readable instructions stored in the computer-readable media 1006, which can program the processor(s) 1004 to perform the functions described herein.

The computer-readable media 1006 can include volatile and nonvolatile memory and/or removable and non-removable media implemented in any type of technology for storage of information, such as computer-readable instructions, data structures, program modules, or other data. Such computer-readable media 1006 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1002, the computer-readable media 1006 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1006 can be used to store any number of functional components that are executable by the processors 1004. In many implementations, these functional components comprise instructions or programs that are executable by the processors 1004 and that, when executed, specifically configure the one or more processors 1004 to perform the actions attributed above to the service provider and/or payment processing service. Functional components stored in the computer-readable media 1006 can include a payment processing module 1012, which can include an order management module 1014 and a target customer identification module 1016, and an inventory management module 1018.

The payment processing module 1012 can process payments on behalf of merchants that have accounts with the payment processing service. In an example, the payment processing module 1012 can receive payment data from a POS application installed on a user computing device with a request to authorize the corresponding payment instrument for a cost of a transaction. The payment processing module 1012 can process payment for the cost of the transaction. That is, the payment processing module 1012 can send a request to authorize the payment data for a cost of at least the item to a payment network associated with the payment instrument. The payment network can send an indication whether the payment instrument is authorized (or not). Based on receiving an indication that the payment instrument is authorized, the payment processing module 1012 can authorize the transaction and, in some examples, can send an indication to the user computing device communicating such.

The payment processing module 1012 can provide various functionalities to enable merchants to use the payment processing service. In at least one example, the payment processing module 1012 can enable merchants to build and manage orders via the order management module 1014. The order management module 1014 can thus enable merchants to build and manage orders. In at least one example, the order management module 1014 can exchange data with UIs for order management on user computing devices as described above. Additionally, the order management module 1014 can generate and/or store instructions for presenting GUIs to enable merchants and/or customers to add items to a ticket. Further, the order management module 1014 can store tickets (or duplicates thereof) and can facilitate updating tickets based on interactions between customers and merchants.

The target customer identification module 1016 can identify target customer(s) to notify of various opportunities and can cause notifications to be presented to the target customers. The target customer identification module 1016 can perform operations such as those described above with reference to FIG. 8.

The inventory management module 1018 can manage the inventory database 1024. That is, the inventory management module 1018 can receive transaction data from the payment processing module and, based on receiving the transaction data, can update the inventory database 1024. Furthermore, in at least one example, the inventory management module 1018 can perform operations as described above with reference to FIG. 5.

Additional functional components stored in the computer-readable media 1006 can include an operating system 1020 for controlling and managing various functions of the server(s) 1002. In at least one example, the computer-readable media 1006 can include or maintain other functional components and data, such as other modules and data 1022, which can include programs, drivers, etc., and the data used or generated by the functional components. Further, the server(s) 1002 can include many other logical, programmatic and physical components, of which those described above are merely examples that are related to the discussion herein.

In at least one example, the computer-readable media 1006 can store one or more databases. In additional or alternative examples, one or more databases can be remotely located and accessible to the computer-readable media 1006. The one or more databases can include the inventory database 1024 (e.g., storing inventory data), a customer database 1026 (e.g., storing customer profiles), and a merchant database 1028 (e.g., storing merchant profiles). While depicted and described as databases, in additional or alternative examples, the databases can be any type of data storage or data repository.

The inventory database 1024 can store data associated with inventory items that are offered for sale (or other means of acquisition) by merchants associated with the payment processing service. For instance, data associated with an item can include a description of the item, a price of the item, a discount available for the item, taxes applicable to the item, a location of the item, image(s) of the item, characteristic(s) of the item, etc. As described above, in some examples, data associated with an item can be associated with an indication that the item is sharable, a portion size associated with the item, a number of portions available for the item, a period of time after which a subsequent request to share an item must be received, a cost of a portion of an item, etc. In some examples, such merchants can be "different merchants," as described above. That is, the inventory database 1024 can store inventory data for two or more unrelated merchants (e.g., merchants that are different legal entities that do not share accounting, employees, branding, etc., having different names, EINs, lines of business (in some examples), inventories (or at least portions thereof) and/or the like).

The customer database 1026 can store customer profiles associated with customers (e.g., of merchants that utilize the payment processing service). A customer profile can be associated with customer data ("characteristics") (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, interactions associated with such reservations, etc.), sharing history (e.g., items previously shared, previous requests to share an item (fulfilled or unfulfilled), etc.), customer service data, etc. Additional or alternative customer data can be stored in the customer profiles.

The merchant database 1028 can store merchant profiles associated with merchants that utilize payment processing services of the payment processing service (e.g., in a merchant database). That is, the merchant database 1028 can store merchant profiles associated with two or more unrelated merchants (e.g., merchants that are different legal entities that do not share accounting, employees, branding, etc., having different names, EINs, lines of business (in some examples), inventories (or at least portions thereof) and/or the like). A merchant profile can include merchant data associated with a merchant including, but not limited to, a merchant category classification (MCC), item(s) offered for sale by the merchant (e.g., inventory), transaction data associated with transactions conducted by the merchant (e.g., POS transactions), bank information associated hardware (e.g., device type) used by the merchant, geolocations of physical stores of the merchant, previous loans made to the merchant, previous defaults on said loans, an indication of risk (e.g., based at least in part on fraud, chargeback, etc.) associated with the merchant, etc. In at least one example, a merchant profile can be mapped to, or otherwise associated with, a portion of the inventory database 108 associated with the merchant's inventory. A merchant profile can store additional or alternative types of merchant data.

The communication interface(s) 1008 can include one or more interfaces and hardware components for enabling communication with various other devices, such as over the network(s) 1408. For example, communication interface(s) 1008 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server(s) 1002 can further be equipped with various input/output (I/O) devices 1010. Such I/O devices 1010 can include a display, various user interface controls (e.g., buttons, joystick, keyboard, mouse, touch screen, etc.), audio speakers, connection ports and so forth. In at least one example, the server(s) 1002 can further include one or more timers 1030 for tracking time, as described above.

Figure 11:
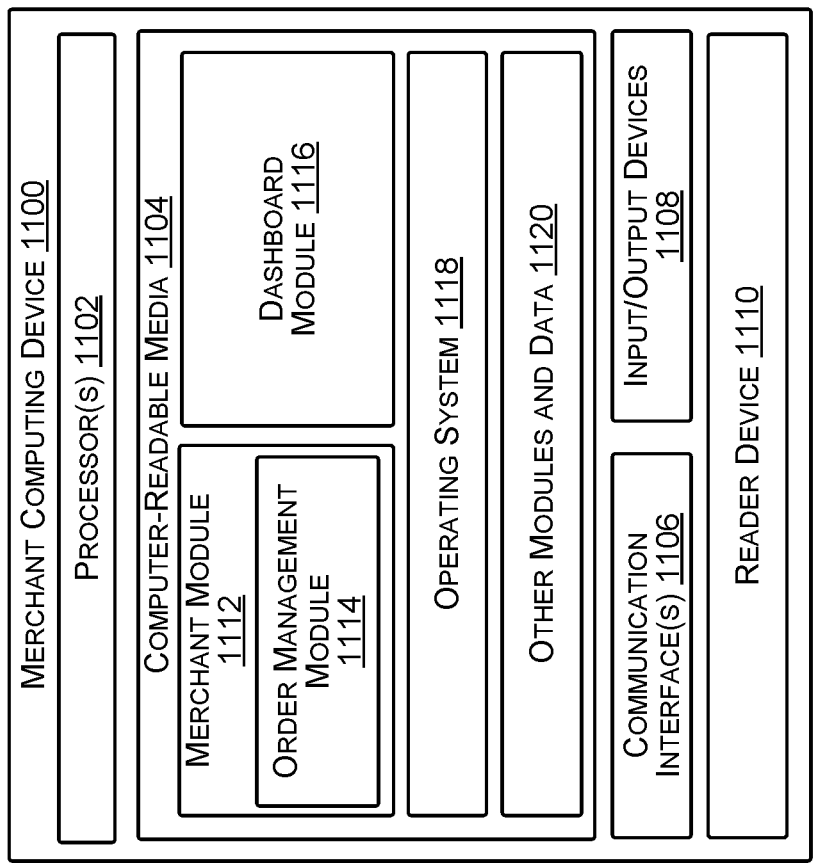
FIG. 11 illustrates an example merchant computing device for performing techniques as described herein.

FIG. 11 illustrates an example merchant computing device 1100 for performing techniques as described herein. The merchant computing device 1100 can be any suitable type of computing device, e.g., portable, semi-portable, semi-stationary, or stationary. Some examples of the merchant computing device 1100 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, any of the user computing device(s) described above with reference to FIGS. 1 and 2, for example, can be the merchant computing device 1100.

The merchant computing device 1100 is shown as a single device; however, in some examples, the merchant computing device 1100 can comprise multiple computing devices that are in communication with one another to perform functions attributed to the merchant computing device 1100.

In the illustrated example, the merchant computing device 1100 can include one or more processors 1102, one or more computer-readable media 1104, one or more communication interfaces 1106, one or more input/output devices 1108, and a reader device 1110. Each processor 1102 can be a single processing unit or a number of processing units, and can include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions.

For example, the processor(s) 1102 can be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 can include volatile and nonvolatile memory and/or removable and non-removable media implemented in any type of technology for storage of information, such as computer-readable instructions, data structures, program modules, or other data. Such computer-readable media 1104 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the merchant computing device 1100, the computer-readable media 1104 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1104 can be used to store any number of functional components that are executable by the processors 1102. In many implementations, these functional components comprise instructions or programs that are executable by the processors 1102 and that, when executed, specifically configure the one or more processors 1102 to perform the actions attributed above to the service provider and/or payment processing service. Functional components stored in the computer-readable media 1104 can include a merchant module 1112, which can include an order management module 1114, and a dashboard module 1116.

In at least one example, the merchant module 1112 can configure the merchant computing device 1100 to, collectively with the reader device 1110, process one or more transactions and transmit transaction data associated with the one or more transactions to the server(s) 1002. That is, the merchant module 1112 can configure the merchant computing device 1100 as a POS terminal to, among other things, process transactions via the payment processing service (e.g., the server(s) 1002). In at least one example, the merchant module 1112 can present various user interfaces to enable a merchant to conduct transactions, receive payments, and so forth. In at least one example, the merchant module 1112 can send data associated with the payments (e.g., transaction data) to the server(s) 1002. Such transaction data, which can include, but is not limited to encrypted payment data, user authentication data, purchase amount information, point-of-purchase information, etc., can be stored in the merchant database 1028, in association with merchant profiles. In at least one example, a data item associated with a transaction can include item(s) acquired via the transaction, a payment instrument associated with the transaction, a cost of the transaction, parties (e.g., customer, merchant) to the transaction, etc.

The merchant module 1112 can provide various functionalities to enable merchants to use the payment processing service. In at least one example, the merchant module 1112 can enable merchants to build and manage orders via the order management module 1114. The order management module 1114 can thus enable merchants to build and manage orders. In at least one example, the order management module 1114 can present UIs for order management via an input/output device 1108 of the merchant computing device 1100. Additionally, the order management module 1114 can generate, store, and/or execute instructions for presenting GUIs to enable merchants and/or customers to add items to a ticket. Further, the order management module 1114 can store tickets (or duplicates thereof) and can facilitate updating tickets based on interactions between customers and merchants.

Further, the dashboard module 1116 can enable the merchant to manage transactions, payments, and so forth, via a dashboard. For the purpose of this discussion, a "dashboard" can be a user interface that provides an at-a-glance view of key information (e.g., associated with transactions, payments, etc.).

Additional functional components stored in the computer-readable media 1104 can include an operating system 1118 for controlling and managing various functions of the merchant computing device 1100. In at least one example, the computer-readable media 1104 can include or maintain other functional components and data, such as other modules and data 1120, which can include programs, drivers, etc., and the data used or generated by the functional components. Further, the merchant computing device 1100 can include many other logical, programmatic and physical components, of which those described above are merely examples that are related to the discussion herein.

The communication interface(s) 1106 can include one or more interfaces and hardware components for enabling communication with various other devices, such as over the network(s) 1408. For example, communication interface(s) 1106 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The merchant computing device 1100 can further be equipped with various input/output (I/O) devices 1108. Such I/O devices 1108 can include a display, various user interface controls (e.g., buttons, joystick, keyboard, mouse, touch screen, etc.), audio speakers, connection ports and so forth.

In at least one example, the merchant computing device 1100 can further a reader device 1110 for reading payment instruments. In some examples, the reader device 1110 can plug in to a port in the merchant computing device 1100, such as a microphone/headphone port, a data port, or other suitable port. The reader device 1110 can include a read head for reading a magnetic strip of a payment card, and further can include encryption technology for encrypting the information read from the magnetic strip. Additionally or alternatively, the reader device 1110 can be an EMV payment reader, which in some examples, can be embedded in the merchant computing device 1100. Moreover, numerous other types of readers can be employed with the merchant computing device 1100 herein, depending on the type and configuration of the merchant computing device 1100. In some examples, the reader device 1110 can comprise a second device that can be coupled to the merchant computing device 1110. In at least one example, such a second device can be associated with its own input/output devices for presenting GUIs to facilitate payment processing.

Figure 12:
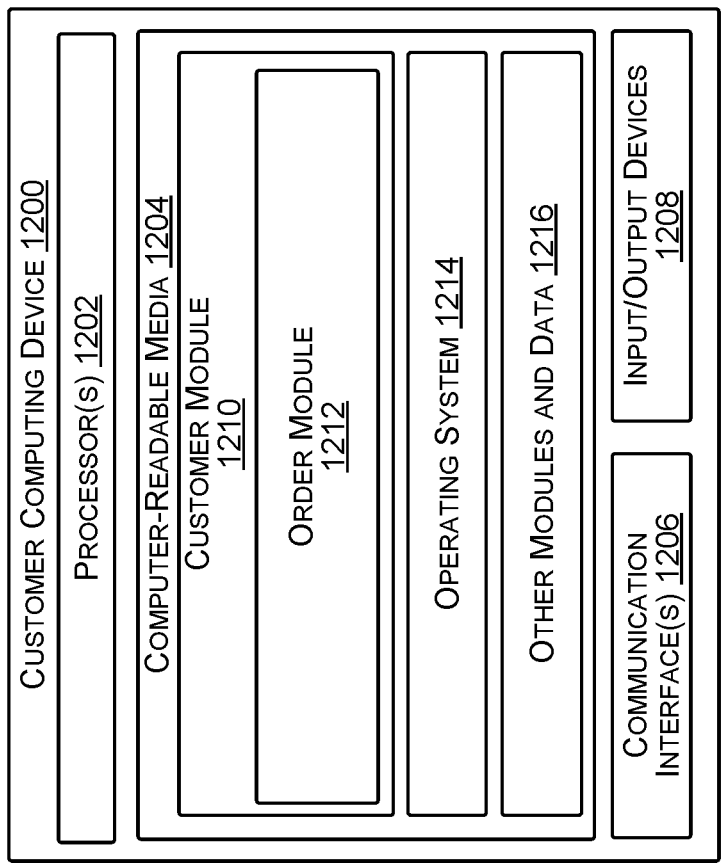
FIG. 12 illustrates an example customer computing device for performing techniques as described herein.

FIG. 12 illustrates an example customer computing device 1200 for performing techniques as described herein. The customer computing device 1200 can be any suitable type of computing device, e.g., portable, semi-portable, semi-stationary, or stationary. Some examples of the customer computing device 1200 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, at least some of the user computing device(s) described above with reference to FIGS. 1 and 2, for example, can be the customer computing device 1200.

The customer computing device 1200 is shown as a single device; however, in some examples, the customer computing device 1200 can comprise multiple computing devices that are in communication with one another to perform functions attributed to the customer computing device 1200.

In the illustrated example, the customer computing device 1200 can include one or more processors 1202, one or more computer-readable media 1204, one or more communication interfaces 1206, and one or more input/output devices 1208. Each processor 1202 can be a single processing unit or a number of processing units, and can include single or multiple computing units or multiple processing cores. The processor(s) 1202 can be implemented as one or more microprocessors, microcomputers, microcontrollers, digital signal processors, central processing units, state machines, logic circuitries, and/or any devices that manipulate signals based on operational instructions. For example, the processor(s) 1202 can be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 can include volatile and nonvolatile memory and/or removable and non-removable media implemented in any type of technology for storage of information, such as computer-readable instructions, data structures, program modules, or other data. Such computer-readable media 1204 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the customer computing device 1200, the computer-readable media 1204 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1204 can be used to store any number of functional components that are executable by the processors 1202. In many implementations, these functional components comprise instructions or programs that are executable by the processors 1202 and that, when executed, specifically configure the one or more processors 1202 to perform the actions attributed above to the service provider and/or payment processing service. Functional components stored in the computer-readable media 1204 can include a customer module 1210, which can include an order module 1212.

In at least one example, the customer module 1210 can configure the customer computing device 1200 to enable a customer to interact with a merchant. The customer application described above can correspond to the customer module 1210 described herein. In some examples, the customer module 1210 can enable a customer to add item(s) to a ticket via the order module 1212. In at least one example, the order module 1212 can present UIs for facilitating orders via an input/output device 1208 of the customer computing device 1200. Additionally, the order management module 1114 can generate, store, and/or execute instructions for presenting GUIs to enable a customer to add items to a ticket. In some examples, the customer module 1210 can present UIs to enable functionality for making reservations, placing delivery orders, scheduling appointments, participating in peer-to-peer payments, or otherwise enabling a customer to interact with merchant(s) that are associated with the payment processing service.

Additional functional components stored in the computer-readable media 1204 can include an operating system 1214 for controlling and managing various functions of the customer computing device 1200. In at least one example, the computer-readable media 1204 can include or maintain other functional components and data, such as other modules and data 1216, which can include programs, drivers, etc., and the data used or generated by the functional components. Further, the customer computing device 1200 can include many other logical, programmatic and physical components, of which those described above are merely examples that are related to the discussion herein.

The communication interface(s) 1206 can include one or more interfaces and hardware components for enabling communication with various other devices, such as over the network(s) 1408. For example, communication interface(s) 1206 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The customer computing device 1200 can further be equipped with various input/output (I/O) devices 1208. Such I/O devices 1208 can include a display, various user interface controls (e.g., buttons, joystick, keyboard, mouse, touch screen, etc.), audio speakers, connection ports and so forth.

The aforementioned description is directed to devices and applications that are related, in part, to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes. Further, techniques described herein are directed to transactions between customers and merchants, but such techniques can be applicable for any type of entity and should not be limited to use by customers and merchants.

While the aforementioned disclosure makes reference to user interactions via a UI presented via a display of a device, the UI can be presented via any input/output device. As an example, the UI can be output via a speaker, and augmented reality (AR) display, a virtual reality (VR) display, etc. That is, in some examples, the interactive image(s) can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, a AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or customer interacting with the UI via a selectable control or touch input, in additional or alternative examples, the merchant can indicate a selection via a spoken input or other type of input.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method comprising:

causing, by one or more computing devices of a service provider, an electronic menu of items offered for sale by a merchant to be presented via a computing device operable by a customer, wherein the computing device operable by the customer is associated with an application, provided by the service provider, for configuring the computing device to (i) present a user interface via which the electronic menu is presented and (ii) exchange communications with the one or more computing devices of the service provider;

receiving, by the one or more computing devices of the service provider, a request to share an item presented via the electronic menu between the customer and at least one other customer that is also at a location of the merchant;

accessing, by the one or more computing devices of the service provider and based at least in part on receiving the request, an inventory of the merchant to determine whether the item is sharable;

causing, by the one or more computing devices of the service provider and based at least in part on determining that the item is sharable, the electronic menu to promote the item as a sharable item, wherein a cost of the sharable item is based on a portion size of the sharable item, and wherein the item is sharable for a period of time after the request is received;

determining, by the one or more computing devices of the service provider and based at least in part on analyzing customer data associated with customers of the service provider using a machine-trained model, one or more target customers that are likely to be interested in sharing the item;

sending, by the one or more computing devices of the service provider, a notification to one or more computing devices of the one or more target customers, wherein the notification indicates that the item is sharable for the period of time;

receiving, by the one or more computing devices of the service provider an indication that a target customer of the one or more target customers desires to share the item with the customer;

allocating, by the one or more computing devices of the service provider and based at least in part on a determination that the item remains available for sharing, a portion of a total cost of the item between a first ticket of the customer and a second ticket of the target customer;

processing, by the one or more computing devices of the service provider, payments for the first ticket and the second ticket; and depositing, by the one or more computing devices of the service provider, funds corresponding to the total cost of the item into a merchant account of the merchant.

2. The computer-implemented method as claim 1 recites, further comprising:

receiving, by the one or more computing devices of the service provider, input indicating that the item is sharable between two or more customers; and associating, by the one or more computing devices of the service provider, data with the item in the inventory of the merchant, the data indicating (i) that the item is sharable between two or more customers, (ii) the portion size associated with the item, and (iii) the period of time.

3. The computer-implemented method as claim 2 recites, further comprising:

determining, by the one or more computing devices of the service provider, that the indication that the target customer desires to share the item with the customer was received within the period of time;

adding, by the one or more computing devices of the service provider, a first split-item indication to the first ticket of the customer; and adding, by the one or more computing devices of the service provider, a second split-item indication to the second ticket of the target customer, wherein allocating the portion of the total cost of the item between the first ticket and the second ticket is based at least in part on the first split-item indication and the second split-item indication.

4. The computer-implemented method as claim 1 recites, wherein:

the first ticket comprises a first data structure for tracking interactions between the customer and the merchant at least while the customer is at the location of the merchant; and the second ticket comprises a second data structure for tracking interactions between the target customer and the merchant at least while the target customer is at the location of the merchant.

5. A system comprising:

one or more processors; and one or more computer-readable media storing instructions that, when executed by the one or more processors, cause the one or more processors to perform operations comprising:

causing, by one or more computing devices of a service provider, an electronic menu associated with one or more items offered for sale by a merchant to be presented via a computing device operable by a customer, wherein the computing device operable by the customer is associated with an application, provided by the service provider, for configuring the computing device to (i) present a user interface via which the electronic menu is presented and (ii) exchange communications with the one or more computing devices of the service provider;

receiving, by the one or more computing devices of the service provider, a first request indicating that an item has been requested by the customer;

determining, by the one or more computing devices of the service provider and based at least in part on accessing an inventory of the merchant, that the item is sharable between multiple customers, wherein the item is sharable for a period of time after the request is received;

updating, by the one or more computing devices of the service provider and based at least in part on a determination that the item is sharable, the electronic menu to indicate that the item is sharable between multiple customers, wherein another customer is capable of ordering at least a portion of the item from an updated electronic menu;

determining, by the one or more computing devices of the service provider and based at least in part on analyzing customer data associated with customers of the service provider using a machine-trained model, one or more target customers that are likely to be interested in sharing the item;

sending, by the one or more computing devices of the service provider, a notification to one or more computing devices of the one or more target customers, wherein the notification indicates that the item is sharable for the period of time;

receiving, by the one or more computing devices of the service provider, a second request that a target customer of the one or more target customers requests to share the item;

allocating, by the one or more computing devices of the service provider and based at least in part on a determination that the period of time has not lapsed and that the item remains sharable, a portion of a total cost of the item between a first ticket of the customer and a second ticket of the target customer;

processing, by the one or more computing devices of the service provider, payments for the first ticket and the second ticket; and depositing, by the one or more computing devices of the service provider, funds corresponding to the total cost of the item into a merchant account of the merchant.

6. The system as claim 5 recites, the operations further comprising:

receiving, by the one or more computing devices of the service provider, input indicating that the item is sharable between multiple customers; and associating, by the one or more computing devices of the service provider, data with the item in the inventory of the merchant, the data indicating that the item is sharable between multiple customers and a portion size associated with the item.

7. The system as claim 6 recites, the operations further comprising causing, by the one or more computing devices of the service provider, the updated electronic menu, including an indication that the item is sharable between multiple customers, to be presented for the period of time.

8. The system as claim 6 recites, the operations further comprising:
responsive to receiving the first request, accessing, by the one or more computing devices of the service provider, the data associated with the item in the inventory; and
determining, by the one or more computing devices of the service provider, that the item is sharable further based at least in part on the data associated with the item in the inventory.

9. The system as claim 5 recites, the operations further comprising:
responsive to receiving the first request, determining, by the one or more computing devices of the service provider, whether the first request is for a portion of the item; and
determining, by the one or more computing devices of the service provider, that the item is sharable further based at least in part on determining that the first request is for the portion of the item.

10. The system as claim 9 recites, wherein the customer data includes at least one of a current location of the customers, previous interactions between the customers and the merchant, or preferences of the customers.

11. The system as claim 5 recites, the operations further comprising:
adding, by the one or more computing devices of the service provider, a first split-item indication to the first ticket corresponding to the customer; and
adding, by the one or more computing devices of the service provider, a second split-item indication to the second ticket corresponding to the target customer, wherein allocating the portion of the total cost of the item between the first ticket and the second ticket is based at least in part on the first split-item indication and the second split-item indication.

12. The system as claim 11 recites, wherein the first ticket and the second ticket are separate data structures for tracking sharable or non-sharable items ordered by the customer and the target customer, respectively.

13. The system as claim 5 recites, wherein respective portions of the total cost allocated between the first ticket and the second ticket are based on portions ordered by the customer and the target customer.

14. One or more computer-readable media storing instructions that, when executed by one or more processors, cause the one or more processors to perform operations comprising:
causing, by one or more computing devices of a service provider, an electronic menu of items offered for sale by a merchant to be presented via a computing device operable by a customer, wherein the computing device operable by the customer is associated with an application, provided by the service provider, for configuring the computing device to (i) present a user interface via which the electronic menu is presented and (ii) exchange communications with the one or more computing devices of the service provider;
receiving, by the one or more computing devices of the service provider, a request to share an item presented via the electronic menu between the customer and at least one other customer that is also at a location of the merchant;
accessing, by the one or more computing devices of the service provider and based at least in part on receiving the request, an inventory of the merchant to determine whether the item is sharable;
causing, by the one or more computing devices of the service provider and based at least in part on determining that the item is sharable, the electronic menu to promote the item as a sharable item, wherein a cost of the sharable item is based on a portion size of the sharable item, and wherein the item is sharable for a period of time after the request is received;
determining, by the one or more computing devices of the service provider and based at least in part on analyzing customer data associated with customers of the service provider using a machine-trained model, one or more target customers that are likely to be interested in sharing the item;
sending, by the one or more computing devices of the service provider, a notification to one or more computing devices of the one or more target customers, wherein the notification indicates that the item is sharable for the period of time;
receiving, by the one or more computing devices of the service provider, an indication that a target customer of the one or more target customers desires to share the item with the customer;
allocating, by the one or more computing devices of the service provider and based at least in part on determining that the item remains available for sharing when the indication is received, a portion of a total cost of the item between a first ticket of the customer and a second ticket of the target customer;
processing, by the one or more computing devices of the service provider, payments for the first ticket and the second ticket; and
depositing, by the one or more computing devices of the service provider, funds corresponding to the total cost of the item into a merchant account of the merchant.

15. The one or more computer-readable media as claim 14 recites, the operations further comprising:
receiving, by the one or more computing devices of the service provider, input indicating that the item is sharable between two or more customers; and
associating, by the one or more computing devices of the service provider, data with the item in the inventory of the merchant, the data indicating (i) that the item is sharable between two or more customers, (ii) the portion size associated with the item, and (iii) the period of time.

16. The one or more computer-readable media as claim 15 recites, the operations further comprising:
determining, by the one or more computing devices of the service provider, that the indication that the target customer desires to share the item with the customer was received within the period of time;
adding, by the one or more computing devices of the service provider, a first split-item indication to the first ticket of the customer; and
adding, by the one or more computing devices of the service provider, a second split-item indication to the second ticket of the target customer,
wherein allocating the portion of the total cost of the item between the first ticket and the second ticket is based at least in part on the first split-item indication and the second split-item indication.

17. The one or more computer-readable media as claim 14 recites, wherein:
the first ticket comprises a first data structure for tracking interactions between the customer and the merchant at least while the customer is at the location of the merchant; and the second ticket comprises a second data structure for tracking interactions between the target customer and the merchant at least while the target customer is at the location of the merchant.

18. The one or more computer-readable media as claim 15 recites, the operations further comprising causing, by the one or more computing devices of the service provider, the electronic menu, including the indication that the item is sharable, to be displayed for the period of time.

19. The computer-implemented method as claim 1 recites, further comprising based at least in part on receiving the input indicating the item is sharable between two or more customers, associating, by the one or more computing devices of the service provider, an indicator with the item in the inventory of the merchant, wherein determining that the item is sharable is further based at least in part on the item being associated with the indicator in the inventory of the merchant.

20. The computer-implemented method as claim 1 recites, wherein the electronic menu, when presented via the computing device operable by the customer, is configured according to the computing device operable by the customer.

* * * * *